US008027854B2

(12) United States Patent
Baggett et al.

(10) Patent No.: US 8,027,854 B2
(45) Date of Patent: Sep. 27, 2011

(54) METHOD, SYSTEM, AND COMPUTER PROGRAM PRODUCT FOR INTERFACING WITH INFORMATION SOURCES

(75) Inventors: David M. Baggett, Hermosa Beach, CA (US); Gregory R. Galperin, Cambridge, MA (US)

(73) Assignee: ITA Software, Inc., Cambridge, MA (US)

( * ) Notice: Subject to any disclaimer, the term of this patent is extended or adjusted under 35 U.S.C. 154(b) by 1023 days.

(21) Appl. No.: 11/598,009

(22) Filed: Nov. 13, 2006

(65) Prior Publication Data

US 2007/0055555 A1 Mar. 8, 2007

Related U.S. Application Data

(62) Division of application No. 09/667,235, filed on Sep. 22, 2000, now Pat. No. 7,668,740.

(51) Int. Cl.
*G06Q 10/00* (2006.01)
(52) U.S. Cl. ................... 705/5; 705/1.1; 711/3
(58) Field of Classification Search ............. 705/5, 1.1
See application file for complete search history.

(56) References Cited

U.S. PATENT DOCUMENTS

| | | | |
|---|---|---|---|
| 4,788,643 A | 11/1988 | Trippe et al. |
| 4,807,155 A | 2/1989 | Cree et al. |
| 4,841,442 A | 6/1989 | Hosoyama |
| 4,862,357 A | 8/1989 | Ahlstrom et al. |
| 5,021,953 A | 6/1991 | Webberv |
| 5,237,499 A | 8/1993 | Garback |
| 5,253,166 A | 10/1993 | Dettelbach et al. |
| 5,270,921 A | 12/1993 | Hornick et al. |
| 5,311,425 A | 5/1994 | Inada |
| 5,331,546 A | 7/1994 | Webber et al. |
| 5,408,417 A | 4/1995 | Wilder |

(Continued)

FOREIGN PATENT DOCUMENTS

WO    WO 00/43927 A2    7/2000

(Continued)

OTHER PUBLICATIONS

Chidlovskii, Boris et al., "Semantic Cache Mechanism for Heterogeneous Web Querying," XP004304559, Computer Networks, Elsevier Science Publishers B.V., Amsterdam, Netherlands, vol. 31. No. 11-16.

(Continued)

*Primary Examiner* — Shannon S Saliard
(74) *Attorney, Agent, or Firm* — Garrett IP, L.L.C.

(57) ABSTRACT

A method, system and computer program product for interfacing between information requesters and information sources. In an embodiment, information is obtained from one or more information sources in response to client requests. In an embodiment, information received from information sources is cached for future use, such as for future client requests. In a caching embodiment, information can also be received by monitoring traffic between an information source and a third party, and/or by proactively querying the information sources. Proactive queries can be generated to populate a cache and/or to update presently cached information. In a caching embodiment, the invention includes methods for determining whether to respond to a request for information out-of-cache and/or with real-time information from an information source. In an embodiment, the invention interfaces with airline availability information sources. The invention also includes, without limitation, methods for interfacing with information sources through proxies, methods for ordering and prioritizing queries, methods for processing queries in a distributed architecture, and time-out features.

35 Claims, 22 Drawing Sheets

U.S. PATENT DOCUMENTS

| | | | |
|---|---|---|---|
| 5,422,809 A | | 6/1995 | Griffin et al. |
| 5,463,546 A | | 10/1995 | Parkhurst |
| 5,500,929 A | | 3/1996 | Dickinson |
| 5,528,757 A | | 6/1996 | Yamasaki |
| 5,530,852 A | | 6/1996 | Meske, Jr. et al. |
| 5,544,041 A | | 8/1996 | Nekomoto |
| 5,570,283 A | | 10/1996 | Shoolery et al. |
| 5,572,643 A | | 11/1996 | Judson |
| 5,581,461 A | | 12/1996 | Coll et al. |
| 5,644,721 A | | 7/1997 | Chung et al. |
| 5,715,453 A | | 2/1998 | Stewart |
| 5,724,033 A | * | 3/1998 | Burrows .................. 341/76 |
| 5,732,219 A | | 3/1998 | Blumer et al. |
| 5,781,892 A | | 7/1998 | Hunt et al. |
| 5,793,966 A | | 8/1998 | Amstein et al. |
| 5,797,127 A | | 8/1998 | Walker et al. |
| 5,826,269 A | * | 10/1998 | Hussey .................. 1/1 |
| 5,832,451 A | | 11/1998 | Flake et al. |
| 5,832,454 A | | 11/1998 | Jafri et al. |
| 5,835,716 A | | 11/1998 | Hunt et al. |
| 5,839,114 A | | 11/1998 | Lynch et al. |
| 5,842,176 A | | 11/1998 | Hunt et al. |
| 5,852,717 A | | 12/1998 | Bhide et al. |
| 5,864,822 A | | 1/1999 | Baker, III |
| 5,870,714 A | | 2/1999 | Shetty et al. |
| 5,892,905 A | | 4/1999 | Brandt et al. |
| 5,897,620 A | | 4/1999 | Walker et al. |
| 5,897,622 A | | 4/1999 | Blinn et al. |
| 5,930,761 A | | 7/1999 | O'Toole |
| 5,933,810 A | | 8/1999 | Okawa |
| 5,948,040 A | | 9/1999 | DeLorme et al. |
| 6,018,715 A | | 1/2000 | Lynch et al. |
| 6,021,426 A | | 2/2000 | Douglis et al. |
| 6,023,679 A | | 2/2000 | Acebo et al. |
| 6,026,429 A | | 2/2000 | Jones et al. |
| 6,041,305 A | | 3/2000 | Sakurai |
| 6,049,821 A | | 4/2000 | Theriault et al. |
| 6,058,370 A | | 5/2000 | Church et al. |
| 6,070,184 A | | 5/2000 | Blount et al. |
| 6,085,164 A | | 7/2000 | Smith et al. |
| 6,085,169 A | | 7/2000 | Walker et al. |
| 6,098,081 A | | 8/2000 | Heidorn et al. |
| 6,349,295 B1 | | 2/2002 | Tedesco et al. |
| 6,922,708 B1 | | 7/2005 | Sedlar |
| 2002/0010746 A1 | | 1/2002 | Jilk et al. |
| 2002/0099691 A1 | | 7/2002 | Lore et al. |
| 2002/0178161 A1 | | 11/2002 | Brezin et al. |
| 2003/0206554 A1 | | 11/2003 | Dillon |
| 2004/0064570 A1 | | 4/2004 | Tock |
| 2005/0034135 A1 | | 2/2005 | Warwick et al. |
| 2006/0253896 A1 | | 11/2006 | Sitaraman et al. |

FOREIGN PATENT DOCUMENTS

| | | | |
|---|---|---|---|
| WO | WO 00/46715 | * | 8/2000 |

OTHER PUBLICATIONS

Erni, A. and Norris, M.C., "SnowNet: An Agent-Based Internet Tourist Information Service," Proc. 4th Int. Conf. on Information and Communications Technology in Tourim, Jan. 1997, pp. 1-8.

Padmanabhan, Venkata N. et al., "Using Predictive Prefetching to Improve World Wide Web Latency," XP000607179, Computer Communications Review, Association for Computing Machinery, New York, New York, vol. 26, No. 3, Jul. 1, 1996, pp. 22-36.

Sarukkai, Ramesh R., Link Prediction and Path Analysis Using MarKov Chains, 1999, 14 pages.

Schechter et al., Using Path Profiles to Predict http Requests, 1998, 14 pages.

Wooster, Roland P., et al., "Proxy Caching that Estimates Page Load Delays," XP004095296, Computer networks and ISDN Systems, North Holland Publishing, Amsterdam, Netherlands, vol. 29, No. 8-13, pp. 977-986.

PCT International Application No. WO 00/46715, Publication Date Aug. 10, 2000.

* cited by examiner

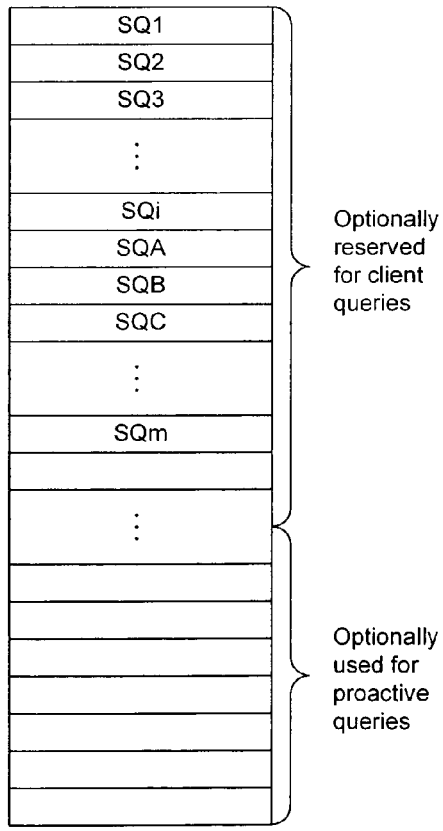
FIG. 5
FIG. 7
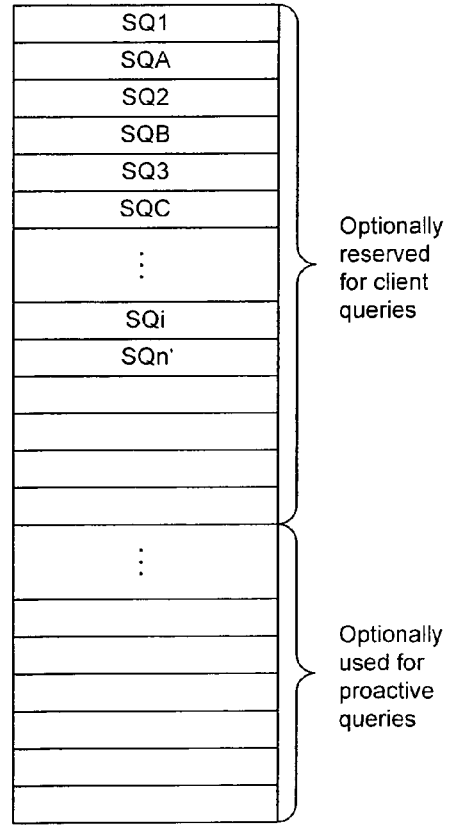
FIG. 6
FIG. 8

METHOD, SYSTEM, AND COMPUTER PROGRAM PRODUCT FOR INTERFACING WITH INFORMATION SOURCES

CROSS REFERENCE TO RELATED APPLICATIONS

This application is a Divisional Application of U.S. patent application Ser. No. 09/667,235, filed on Sep. 22, 2000, (pending), which is incorporated herein by reference in its entirety.

BACKGROUND OF THE INVENTION

1. Field of the Invention

The invention relates generally to interfacing between clients and information sources and, more particularly, to optimizing use of available bandwidth between the clients and information sources using one or more information caching features, information source management features, query handling features, and/or distributed architecture features described herein.

2. Related Art

Information systems are often bandwidth limited in the number of requests for information they can handle within a given period of time.

For example, tasks like pricing an airline ticket and searching for a lowest available airfare (low fare search) require flight availability information as input. Flight availability information typically indicates what seats are available on a given flight, and/or at what price levels. Airline flight availability information is maintained on a variety of different information systems, such as computer reservation systems (CRSs), such as those operated and/or maintained by Sabre, Galileo, Worldspan, or Amadeus.

Typically availability information is retrieved from an airline availability information source, such as a CRS, by sending a message to the information source. Often these messages must be sent via a set of proxies, such as computer terminals intended for use by human travel agents.

Conventional proxies can generally send and receive one or two availability messages per second. However, recent technological developments are increasing the demand on information systems, such as CRSs. For example, applications like low fare search require potentially large numbers of availability messages to be sent. Furthermore, such applications are often implemented as parallel processes, where programs running on a many machines may all request availability information, potentially simultaneously.

The increasing demand is expected to increase delays in information retrieval from information sources.

There is a need, therefore, for methods and systems to optimize available bandwidth between information requesters ("clients") and information sources.

In the airline reservation industry, for example, there is a need for methods and systems, such as a software server program, to act as intermediary between clients/applications that need availability information and information systems, such as CRSs and/or CRS proxies that provide the availability information.

SUMMARY OF THE INVENTION

The present invention is directed to a method, system and computer program product for interfacing between information requesters and information sources. Information source can include, without limitation, an electronic information storage device that stores electronic information in one or more files, databases, lists, libraries, modules, routines, subroutines, and/or programs. In an embodiment, information is obtained from one or more information sources in response to client queries. In an embodiment, the invention interfaces with airline availability information sources.

In an embodiment, information received from the one or more information sources is cached for responding to future client requests. When caching is implemented, the invention includes methods for determining whether to respond to a request for information out-of-cache and/or with real-time information from an information source.

In a caching embodiment, information is obtained by proactively querying the information sources. Proactive queries can be generated to populate a cache and/or to update presently cached information.

In a caching embodiment, information is obtained by monitoring traffic between an information source and a third party.

In an embodiment, one or more information sources are queried through one or more proxies that are designed to interface with one or more information sources via a particular protocol or format. Methods for using, selecting, and managing proxies are described herein.

In an embodiment, the invention is implemented in a distributed architecture environment. Methods for implementing the invention in a distributed architecture environment are described herein.

The invention also includes, without limitation, methods for ordering and prioritizing queries, and time-out features.

BRIEF DESCRIPTION OF THE FIGURES

The present invention will be described with reference to the accompanying drawings, wherein like reference numbers indicate identical or functionally similar elements. Also, the leftmost digit(s) of the reference numbers identify the drawings in which the associated elements are first introduced.

FIG. 5 illustrates a first example client query.

FIG. 6 provides a second example client query.

FIG. 7 illustrates an example placement of the sub-queues from the first and second client queries illustrated in FIGS. 5 and 6, in accordance with the invention.

FIG. 8 illustrates another example placement of the sub-queues from the first and second client queries illustrated in FIGS. 5 and 6, in accordance with the invention.

DETAILED DESCRIPTION OF THE PREFERRED EMBODIMENTS

Figure 1:
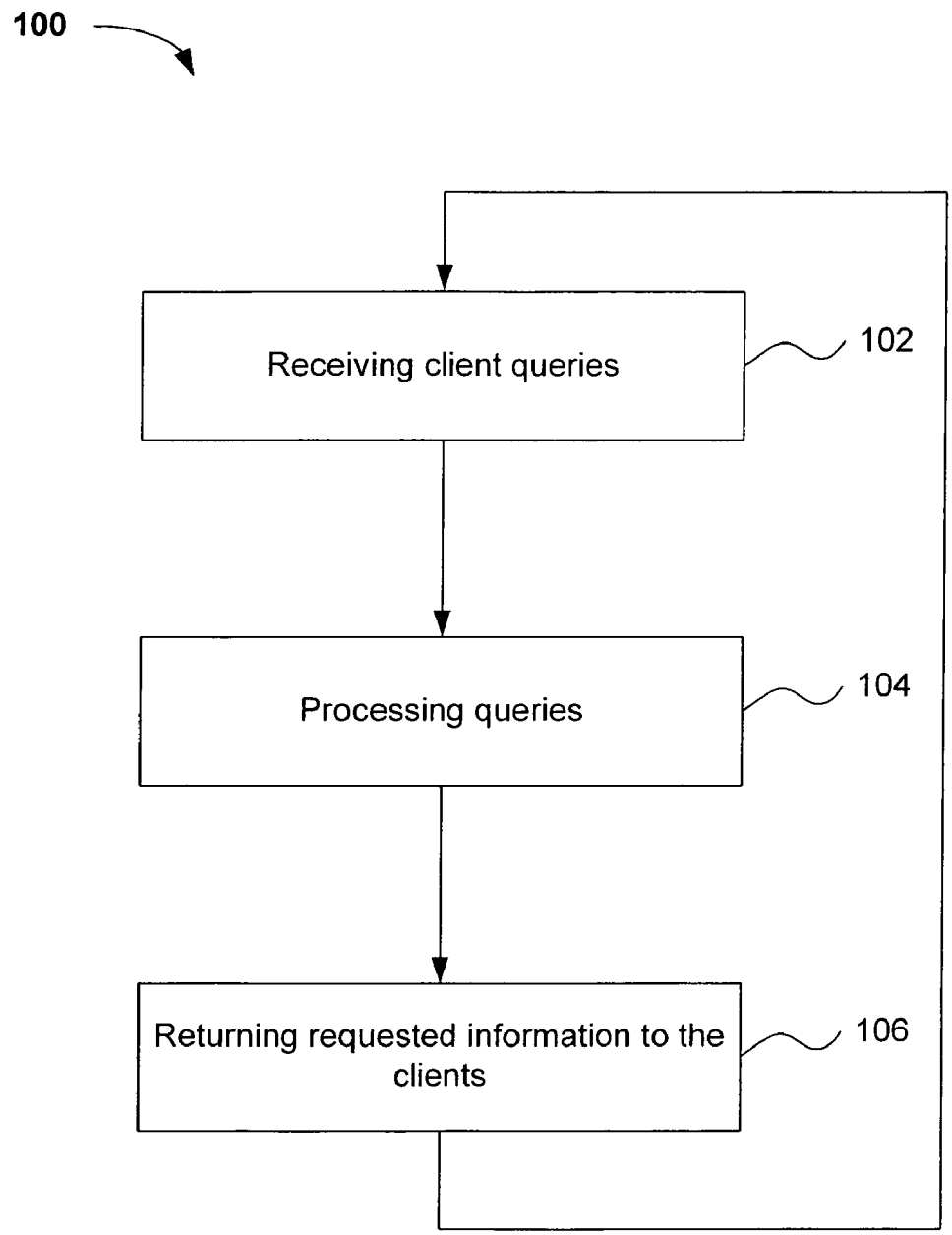
FIG. 1 illustrates a high level process flowchart for interfacing with information sources, in accordance with the present invention.

I. Overview of the Invention
   A. Example Environment—Airline Availability Server
II. Query Handling
   A. Single Process/Multiple Process Threads
   B. Encoding and Compression
   C. Timeouts
   D. Prioritization of Query Components
   E. Mixing and Ordering Query Components from Multiple Clients
   F. Query Priority Queue Examples
III. Caching
   A. Specifying Cache Use in Queries
   B. Treating Recently Cached Data as Real time Information
   C. Implementing a Cache
   D. Approximate Time Matching
   E. Memory Saving Techniques
      1. Sharing Availability Information Among Multiple Flight Records
      2. Sharing Information Among Married Records
      3. Availability Information Compression
   F. Preserving Cache Across Program Invocations
   G. Prioritizing Client Sub-Queries for Processing Based On One Or More Caching Related Factors
   H. Authentication
IV. Proactive Querying
   A. Proactive Query Ordering
      1. Example Implementation—Mathematical Function
      2. Example Implementation—Bucketing
   B. Algorithms and Data Structures for Bucketing
   C. Mathematically Determining Bucket Parameters
   D. Incorporating Other Ordering Criteria
   E. Incorporating Availability Information from Multiple Information Sources
V. Information Source Management
   A. Proxy Interface
      1. Determining Which Proxies are Available
      2. Proxy Priority Queue
      3. Unsupported Suppliers
      4. Faking Replies for Debugging Purposes
VI. Distributed Architecture
   A. Internal Representation of an RC File
   B. Query Forwarding
   C. Intelligent Query Routing
   D. Broadcast Packets
   E. Distribution of Data to Remote Processes
VII. Example Implementations
   A. Example Methods
   B. Example Systems
   C. Example Computer Program Products
VIII. Conclusions I. Overview of the Invention The present invention is a method, system and computer program product for interfacing between one or more clients and one or more information sources. Clients can include, without limitation, human users, computer systems, such as servers, and/or any other entity or device that poses queries to information sources. Information sources can include, without limitation, information storage systems, databases, including internet accessible systems and non-internet accessible systems.

The invention includes a variety of features that can be practiced alone or in various combinations with one another.

The invention can be implemented for a variety of types of information and information sources. In the description that follows, examples are provided for airline availability information retrieval. The examples are provided to illustrate features of the invention. The invention is not limited to the examples provided herein. Based on the description herein, one skilled in the relevant art(s) will understand that the present invention can be implemented for other types of information and information systems.

Such other implementations are within the scope of the present invention.

In an embodiment, the invention includes one or more of the following query handling features:
   single tasking query processing;
   multi-tasking query processing;
   query and/or reply encoding and/or compression;
   time-out features that insure timely response to clients; and
   query and/or query component prioritizing.

Query and/or query component prioritizing generally refers to the order in which queries and/or query components are processed by a server in accordance with the invention.

For example, in an embodiment, queries include one or more sub-queries or query components that can be processed independently of one another. Sub-queries are prioritized with respect to one another and processed according to their relative priorities.

In an embodiment, sub-queries are placed in a query priority queue and processed according to their relative priorities. For example, when a client submits a request for airline availability information for a plurality of flights and/or markets, the flights and/or markets in the query are prioritized with respect to one another. Availability information is then retrieved according to their respective priorities. In an embodiment, priority is assigned according to the order in which a client lists the sub-queries. Alternatively, other prioritizing schemes are used.

In an embodiment, queries and sub-queries from different clients are prioritized with respect to one another, based on one or more factors. For example, in an embodiment, when multiple client queries are received at the same time, sub-queries from the multiple clients are placed in a queue and ordered for processing, whereby no client's second highest priority sub-query is processed before another client's first highest priority sub-query.

A concept related to, but not to be confused with query prioritizing is proactive query ordering, which is described below.

In an embodiment, the invention caches information retrieved from one or more information sources. Generally, cached information is used at least to respond to future queries. Other potential uses of cached information are described below. Generally, cached information can be returned to clients faster than real time information. One reason for this is the elimination of the round trip of a query from a server to an information source and the return of requested information from the information source to the server. Another reason is, where an information source has limited bandwidth to handle queries, queries may stack up in a queue waiting to be processed. This is frequently the case for information sources maintained on older systems, such as mainframe systems, with inefficient control systems.

In an example caching embodiment, the invention includes logic and/or other determinative/selective processes to determine whether to reply to a client query with cached information and/or real time information. In an embodiment, users are permitted to indicate a preference for cached information and/or real time information. Other factors can also be considered.

In an embodiment, the invention proactively queries one or more information sources to populate a cache and/or update previously cached information, without necessarily waiting for a client request for the information. In an embodiment, proactive queries are ordered for processing according to one or more factors. This is referred to as proactive query ordering.

In an embodiment, the invention interfaces with one or more information sources using proxies that are designed to reformat queries to the information sources and/or replies from the information sources, in accordance with information source-specific formatting requirements. In an embodiment, multiple instances of one or more proxy applications can be initiated to interface with multiple information sources.

In an embodiment, proxies are monitored to optimize query processing. For example, proxies can be monitored to determine which proxies are available for sending queries to information sources, to identify better performing proxies and/or for maintaining lists of information sources that can or cannot be accessed by one or more proxies. In an embodiment, the invention generates proxy test messages, queries and/or replies, that can be used for test and/or debugging purposes.

In an embodiment, the invention operates in a distributed architecture computer environment and includes one or more optional features, including, without limitation:
 internal representation of run control ("RC") files;
 query forwarding;
 intelligent query routing;
 broadcast packets; and
 distribution of data to remote processes.
These optional features are described below.

Where similar information is available from multiple information sources, the invention can be implemented to retrieve and process the similar data in order to provide better responses to clients than if only a single information source were queried.

FIG. 1 illustrates a high level process flowchart 100 for interfacing with information sources, in accordance with the present invention. The process begins at step 102, which includes receiving client queries.

Step 104 includes processing queries, which can include processing the client queries and/or other types of queries described herein. Step 104 includes one or more of the query processing features disclosed herein. For example, step 104 can include one or more of:
 single tasking query processing;
 multi-tasking query processing;
 query and/or reply encoding and/or compression;
 time-out features that insure timely response to clients; and
 query and/or query component prioritization.

In an embodiment, step 104 includes determining whether to provide real time information, cached information, or a combination of real time information and cached information.

In an embodiment, step 104 is performed using proxies to interface with one or more information sources.

In an embodiment, step 104 is performed in whole or in part in a distributed architecture computer environment.

In an embodiment, step 104 includes determining whether to reply to a client query with cached information, real time information, or a combination of cached information and real time information.

Step 104 can include any of a variety of other processing features described herein, alone or in combination with one another.

Step 106 includes returning requested information to the one or more clients.

Further details with respect to steps 102-106, as well as additional optional features, are described below.

Figure 2:
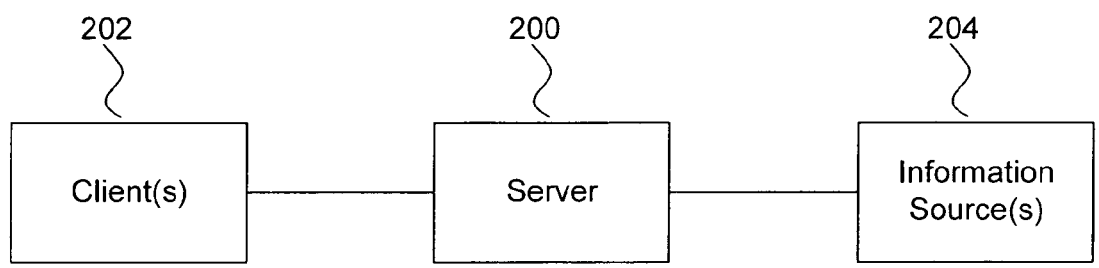
FIG. 2 illustrates a high level block diagram of an example server for implementing the process flowchart illustrated in FIG. 1.

FIG. 2 illustrates a high level block diagram of an example server 200 for implementing the process 100 illustrated in FIG. 1. However, the invention is not limited to the example server 200 illustrated in FIG. 2. Based on the description herein, one skilled in the relevant art(s) will understand that the invention can be practiced with implementations other than the server 200. Such other implementations are within the scope of the present invention.

In FIG. 2, the server 200 interfaces between one or more clients 202a-202n and one or more information sources 204a-204n. Clients 202a-202n can be human clients and/or automated systems, such as, without limitation, computer based systems. The information sources 204a-204n can be any type of information source, including, without limitation, real time information sources and/or push-down information sources (described below), and/or one or more airline availability information sources as described below.

The server 200 interfaces with information sources 204a-204n via any of a variety of communication mediums and combinations thereof, including, without limitation, the internet, direct modem link, and/or wireless connection. Based on the description herein, one skilled in the relevant art(s) will understand that the server 200 can interface with information sources 204 via any other media as well.

In operation, queries from clients 202 are received by the server 200, as illustrated in step 102 of FIG. 1. The server 200 processes the queries in accordance with step 104 of FIG. 1. The server 200 then returns requested information to the clients 202 in accordance with step 106 of FIG. 1. For example, where caching is implemented, the server 200 determines whether to provide clients with cached information and/or real time information from one or more information sources 204.

In an embodiment, the server 200 proactively generates queries to populate a cache and/or to update cached information, in anticipation of future client queries. For example, in an embodiment, the server 200 generates a list of queries for information not yet requested by clients. Alternatively, or additionally, the server 200 generates a list of queries for presently cached information.

The proactive queries are preferably ordered for processing according to one or more factors, which can include, without limitation, elapsed time since caching the information, the type of information, frequency of prior changes to the cached information, importance of information, and/or other factors associated with the information. Based on the disclosure herein, one skilled in the relevant art(s) will understand that other factors and combinations of factors can be used to order proactive queries. Such other factors are within the scope of the present invention.

In an embodiment, proactive queries are added to a query priority queue that includes currently pending client queries, whereby proactive queries are generally given lower priority in the query priority queue than currently pending client queries.

Further features of the invention will be apparent from the description herein.

A. Example Environment—Airline Availability Server

The present invention can be practiced with a variety of types of clients and information sources. In an embodiment, the invention is implemented as an availability server, also referred to herein as an "AVS," between one or more clients and one or more product/service availability information sources. For example, the invention can be implemented as an airline AVS, coupled between one or more clients and one or more airline flight availability information sources, such as CRSs.

In order to assist the reader in understanding various features of the invention, examples of some of the features of the invention are provided within an airline AVS environment. However, the various features of the present invention are not limited to airline AVS environments or even to AVS environments in general. Based on the descriptions herein, one skilled in the relevant art(s) will understand that the various features described herein can be implemented with information sources other than availability information sources. Such other implementations are within the scope of the present invention.

When implemented as an airline AVS, the invention can respond to a variety of types of airline availability queries, including, without limitation, flight availability and market availability queries, both of which are described below.

A flight availability query is a query that specifies one or more flights for which a client needs availability information. A flight availability message might, for example, look something like this:

AA 29 JFK-LAX departing Jun. 12, 2000 10:07 a
UA 16 EWR-LAX departing Jun. 13, 2000 2:34 p In the example above, the client wants to know how many seats are available on American Airlines fight 29 from JFK to Los Angeles on June 12, and how many seats are available on United Airlines flight 16 from Newark to Los Angeles on the following day.

Upon receiving a query, a server in accordance with the invention will attempt to retrieve seat availability information for these two flights and reply to the client with a message indicating the number of available seats in each booking class.

The reply to the client may include additional information about each flight, such as expected departure time, meal service provided, on-time performance, equipment type, and so on. Thus, clients can use flight availability messages to obtain and/or verify facts about flights beyond simple availability information.

A market availability query includes a list of one or more markets for which the client needs availability information. A client using a market availability query need not know when specific flights are scheduled. A market availability query might look this:

AA JFK-LAX departing Jun. 12, 2000 10:00 a
UA EWR-LAX via DEN departing Jun. 13, 2000 2:30 p In the example above, the client is requesting a list of American Airlines flights from JFK to Los Angeles departing around 10:00 AM on Jun. 12, 2000, and a list of United Airlines flights from Newark to Los Angeles (connecting in Denver), departing around 2:30 PM on Jun. 13, 2000.

In the example above, the client omits flight numbers in the query. Various other details can be omitted as well. For example, a caller might ask for JFK-LAX flights departing tomorrow at 2 pm without specifying any particular airline.

Upon receiving this market query, a server in accordance with the invention will attempt to retrieve a list of available flights for each market.

As with flight availability replies, the list of flights returned to a client may include details about departure times, expected arrival times, meal service, and so on.

Figure 3:
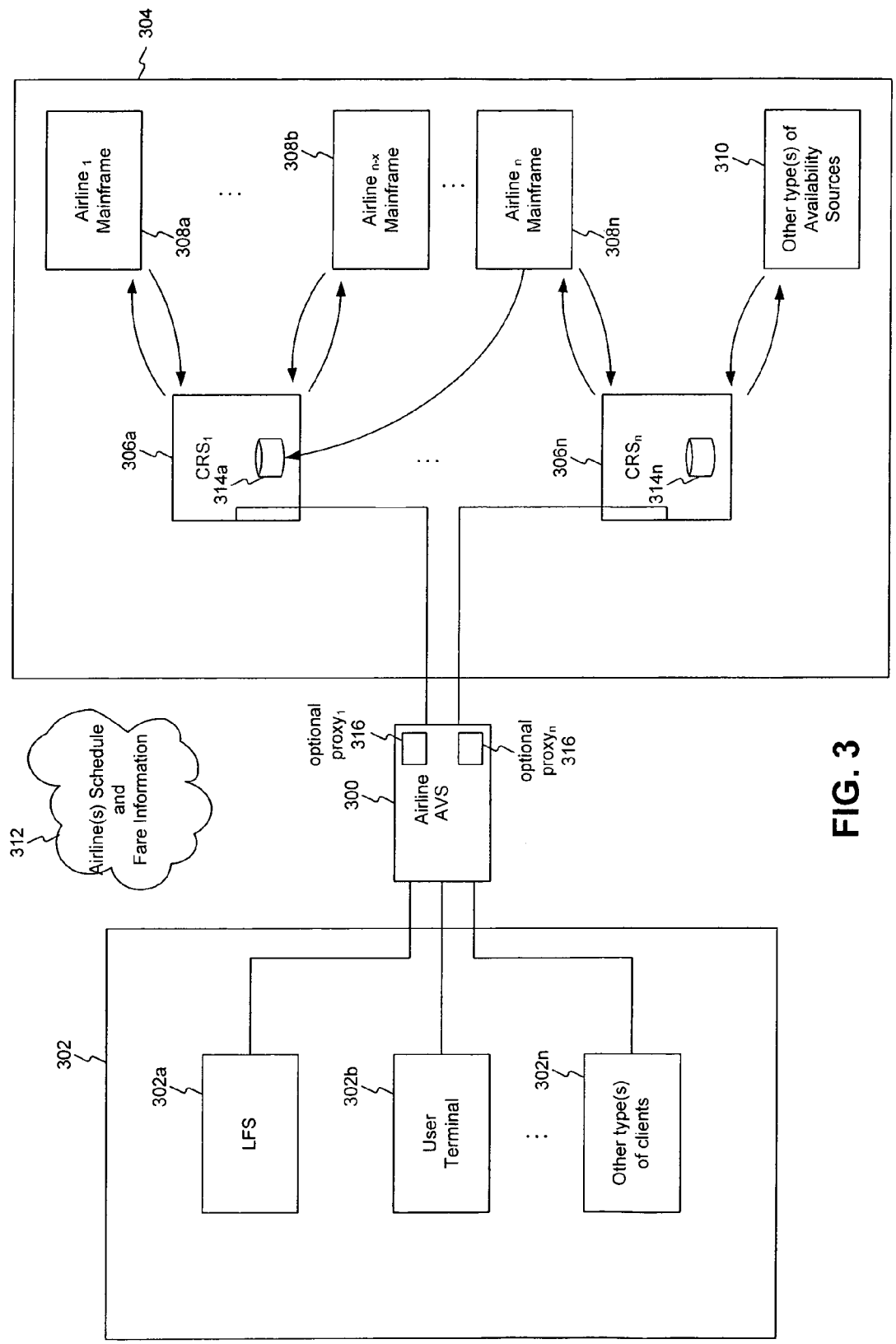
FIG. 3 illustrates an example system for interfacing between clients and information systems, in accordance with the invention.

FIG. 3 illustrates an example airline AVS 300 that interfaces between clients 302 and information systems 304.

In the example of FIG. 3, clients 302 include one or more low fare search systems 302a, one or more user terminals 302b, which may include travel agent proxy terminals and/or internet-coupled user terminals, and one or more other types of terminals 302n.

In the example of FIG. 3, information sources 304 include CRSs 306a-n, airline mainframes 308a-n, and other types of availability sources 310, which may include one or more push-down information services.

The CRSs 306 obtain availability information from one or more airline mainframes 308 and/or other types of availability information sources 310 in one or more of a variety of ways. For example, upon receiving a query from AVS 300, CRS 306a obtains availability information on-demand and in real time from airline mainframes 308a-308b.

In the example of FIG. 3, CRS 306a does not, however, obtain availability information on-demand and in real time from airline mainframe 308n. Instead, availability information is "pushed-down" from airline mainframe 308n to CRS 306a upon one or more predetermined criteria. For example, airline mainframe 308n may push-down availability information when an availability changes by a predetermined amount, or when availability drops below a predetermined amount. Push-down information thus tends to be less accurate than information that is obtained on-demand and in real time.

Availability information that is pushed-down to CRS 306a is stored in an optional storage medium 314a.

One or more of airline mainframes 308a-308n may be dedicated to an individual airline or consortium of airlines.

One or more of the clients 302 receive flight schedule and fare information from one or more sources 312. This information can be used for low fare searching and/or for other purposes.

In operation, clients 302 send availability queries to airline AVS 300, which interfaces with information sources 304 in accordance with the invention. For example, in an embodiment, when airline AVS 300 receives a query from a client 302, it queries one or more information sources to provide real time availability information to the client.

Alternatively, when caching is implemented, airline AVS 300 determines whether to provide real time information and/or cached information to the client 302.

AVS 300 optionally queries one or more information sources 304 through one or more optional proxies 316.

In addition to caching, or alternatively to caching, airline AVS 300 may implement any of a variety of other features of the invention.

II. Query Handling

Various optional query handling features are now presented. Some of the features are alternatives to one another. Some of these features can be practiced in conjunction with one another. Based on the description herein, one skilled in the relevant art(s) will understand that the present invention can be implemented with a variety of combinations of these features.

A. Single Process/Multiple Process Threads

In an embodiment, the invention operates as a single process running on a single machine. In this embodiment, the process listens for queries, over a TCP/IP network socket, for example, processes the queries, and returns the answers to the clients.

Alternatively, the invention utilizes multiple threads. Multiple threads allow an implementor to write code that can perform multiple tasks in parallel. For example, multiple queries, sub-queries, and/or clients can be serviced in parallel. In an embodiment, a separate thread is initiated to process each incoming client query. Alternatively, or additionally, sub threads may be generated for sub-queries. Multithreading helps the server 200, 300 to work at optimum capacity even though, at any given time, some threads may sit idle waiting for external events to occur.

B. Encoding and Compression

In an embodiment, the present invention utilizes one or more encoding schemes. For example, in an airline AVS embodiment, one or more encoding schemes are utilized for flight and market availability queries, such as to represent various possible airline flights.

In an embodiment, the invention utilizes one or more encoding schemes for replying to clients. For example, in an embodiment, one or more encoding schemes are utilized to represent availability and related information about each flight.

Based on the description herein, one skilled in the relevant art(s) will understand that any of a variety of encoding schemes can be utilized.

In an embodiment, the present invention compresses encoded information for transmission over network connections. Suitable compression techniques include, without limitation, standard text compression schemes like Run-Length Encoding, Lempel-Ziv, or Arithmetic Coding. Compression techniques tend to increase CPU requirements and decrease network bandwidth requirements, which is often a favorable trade-off. If the same encoding is used when writing availability results to files (such as logs), compression also tends to save disk space. Logs are described below.

C. Timeouts

In an embodiment, the invention permits replies to client queries within specified time-out periods. In an embodiment, the invention permits clients to specify the time-out periods. For example, clients can specify time-out periods for flight and/or marker availability queries.

For example, in an airline availability implementation, a client query can include a list of multiple flight and/or market sub-queries, which will be processed in some order.

A time-out feature is used to halt processing after a predetermined period of time, even if one or more of the sub-queries have not yet been processed.

In an embodiment, when time is up for a particular query, the server stops working on the query and returns whatever answers it has retrieved. In an embodiment, a control thread is initiated for each query, and multiple worker threads are initiated for each control thread. The worker threads associated with a control thread retrieve answers for components of the query. The control thread sleeps until either all worker threads complete or time expires.

In an embodiment, the server incorporates precise (millisecond-accurate) timers.

D. Prioritization of Query Components

In an embodiment, components of a query are prioritized with respect to one another and the components are processed according to the priorities. In an embodiment, users specify such priorities for query components.

For example, in an airline AVS implementation, where a single query may include requests for availability information for a plurality of flights and/or markets (i.e., sub-queries), the plurality of flights and/or markets within the query are prioritized with respect to one another, and availability information for each flight within the query is obtained according to the corresponding priority.

In an embodiment, clients specify priorities for flight availability and/or market availability queries. A client may, for example, need an answer to some part of a query, such as a particular flight or market, more than answers to other parts of the query. For example, where a low fare search determines that a certain flight combination allows the lowest possible fare, it may be important to obtain availability information for a particular flight in order to return the lowest possible fare to the client. In an embodiment, flights in flight availability queries, and markets in market availability queries, are presumed to be given in order from most to least important. The server can then retrieve answers for each flight/market in turn until time runs out, at which point it will have answered as many important queries as possible.

In an embodiment, query components are placed in a query priority queue, described below.

E. Mixing and Ordering Query Components from Multiple Clients

Recall that a client query typically includes a request for availability information for a plurality of flights and/or markets, and each flight and/or market is considered as a query component. As described above, in an embodiment, query components are presumed to be given in priority order (most important flight or market first). The availability server processes query components in order according to this priority.

This section concerns handling of queries from multiple clients. In an embodiment, the server handles queries from multiple clients on a component by component basis, ordering components so that they are dealt with, in aggregate, in priority order. For example, no client's second flight should be processed before any client's first flight, assuming that all clients' messages arrive contemporaneously. Such a rule ensures that the availability server shares its resources fairly among clients.

Alternatively, or additionally, one or more preferred clients are given some measure of priority over one or more less privileged clients. Such a scheme can be implemented as part of, or on top of the prior example implementation.

To effect proper ordering of query components from multiple clients, a data structure referred to herein as a priority queue is utilized. In an embodiment, a priority queue supports two operations: adding prioritized query components, and removing higher priority components. When a client query is received, the components of the query are added to the queue. Recall that the components may be for requested flights and/or markets. In the queue, these components are mixed in with query components from other clients (flight and/or market components). The priority queue maintains the ordering of the components according to their priority within their originating query.

In order to handle multiple incoming queries at a time, in an embodiment, the invention generates a producer thread for each incoming query component (flight or market). Producer threads are so named because they produce data for subsequent processing.

In parallel, a consumer thread repeatedly pulls the highest priority element off the queue and creates a thread to answer the corresponding query. The thread retrieves the availability information either by consulting the cache or by posing a query to a real time information source, based on the caching policy the client specified in the original message. In this way, the consumer thread may potentially spawn many parallel threads to process queries drawn from the queue. When the consumer thread finds the priority queue empty, it uses a standard facility known as a condition variable to remain idle until a producer thread adds a query to the queue.

F. Query Priority Queue Examples

Figure 4A:
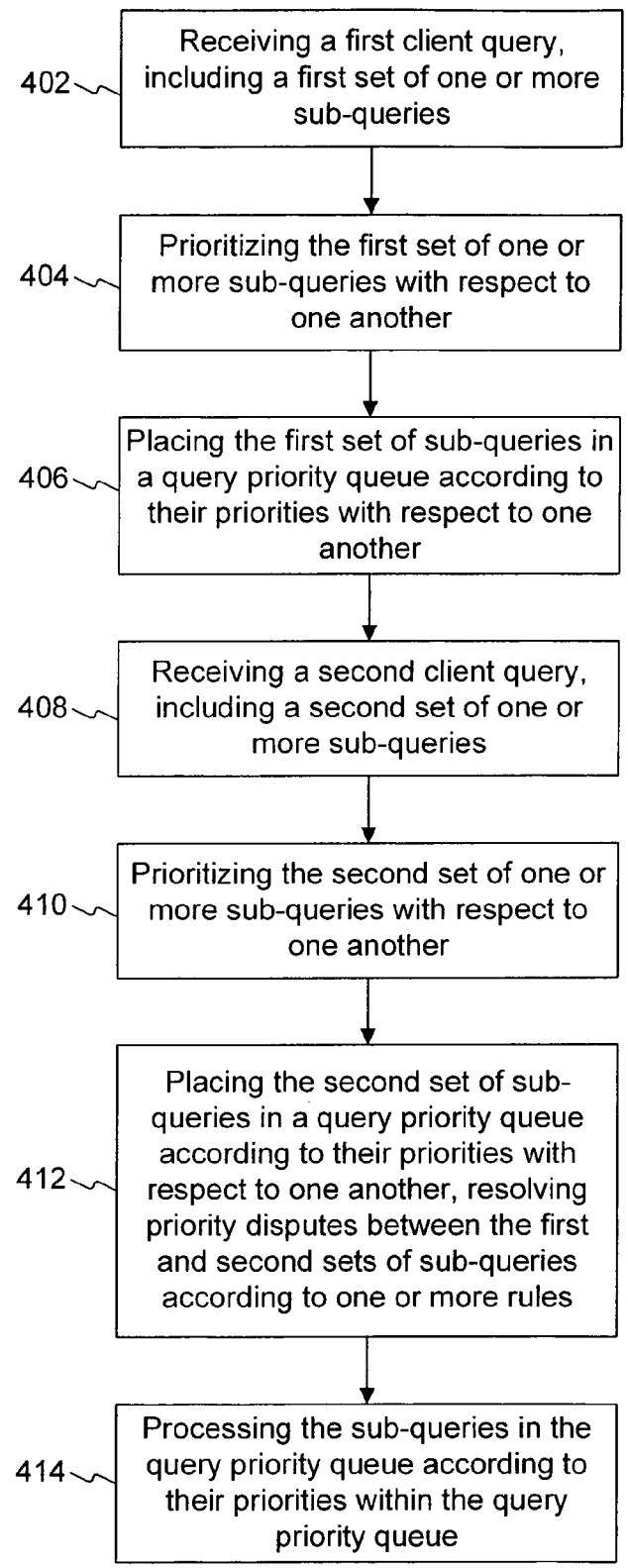
FIG. 4A illustrates an example process flowchart for adding queries to a query priority queue, in accordance with the invention.

FIG. 4A illustrates an example process flowchart for adding queries to a query priority queue. Step 402 includes receiving a first client query, including a list of one or more sub-queries. Step 404 includes prioritizing the list of one or more first client sub-queries with respect to one another.

FIG. 5 illustrates an example client query for a first airline availability request and associated priorities. The left hand column indicates flight and/or market information for availability information is sought. Each left hand column entry (e.g., each flight and/or market entry), is referred to interchangeably herein as a sub-query or a query component. A client query can include any number of sub-queries.

The right hand column in FIG. 5 indicates relative priorities assigned to the sub-queries. In this example, the entries are presumed to be given in order of preference by the client, so that the relative priorities increment in order of entry. Alternatively, other prioritization schemes can be employed. For example, in an embodiment, the client is permitted to attach priories to the entries.

In step 406, the sub-queries illustrated in FIG. 5 are placed in a query priority queue and processed in order, according to their relative priorities. When additional client queries are received, their sub-queries are provided with relative priorities as described above, and they are added to the query priority queue, as illustrated by steps 408 and 410.

The placement of sub-queries from different queries within the queue can be governed by one or more of a variety of rules. For example, in an embodiment, and without limitation, sub-queries of later received client queries are placed in the query priority queue at lower priorities than all sub-queries of previously received client queries. This example is provided in the first portion of step 412, which includes, processing the queries in the priority queue, resolving priority disputes between sub-queries of the first client query and sub-queries of the second client query based on time of receipt of the first and second queries.

To illustrate this example, FIG. 6 provides a second example client query, including sub-queries, received and prioritized in accordance with steps 406 and 408. The first and second client queries can originate from the same client or from different clients. FIG. 7 illustrates placement of the sub-queues from the first and second client queries in accordance with the example above, for when the second client query of FIG. 6 is received after the first client query of FIG. 5. This example is provided in the first portion of step 412.

Figure 4B:
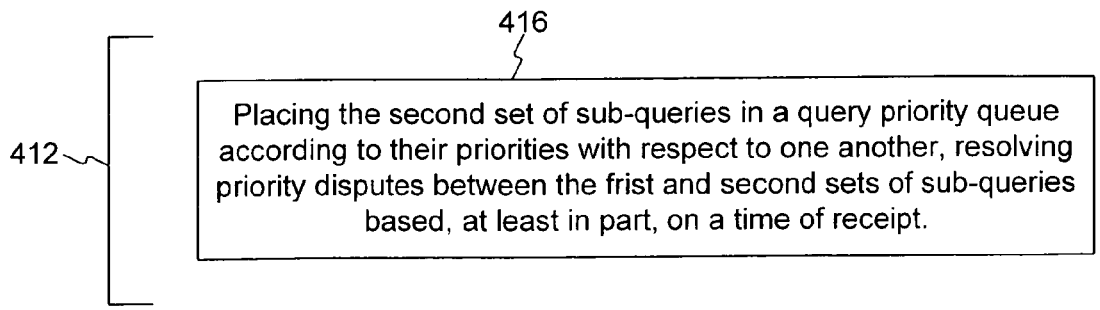
FIG. 4B illustrates an example implementation of step 412 from FIG. 4A.
Figure 4C:
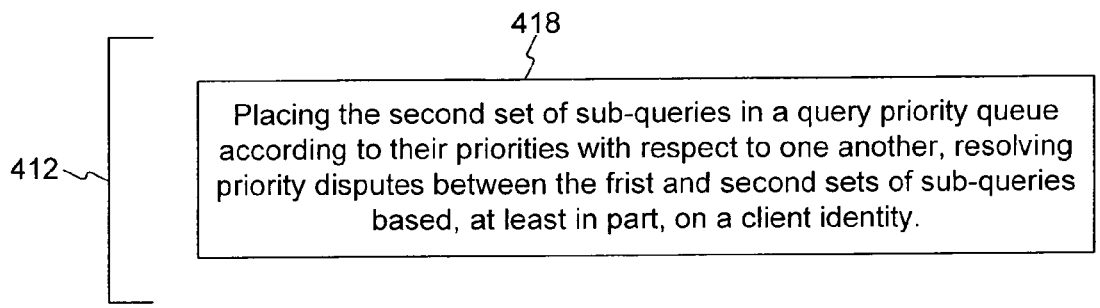
FIG. 4C illustrates an example implementation of step 412 from FIG. 4A.
Figure 4D:
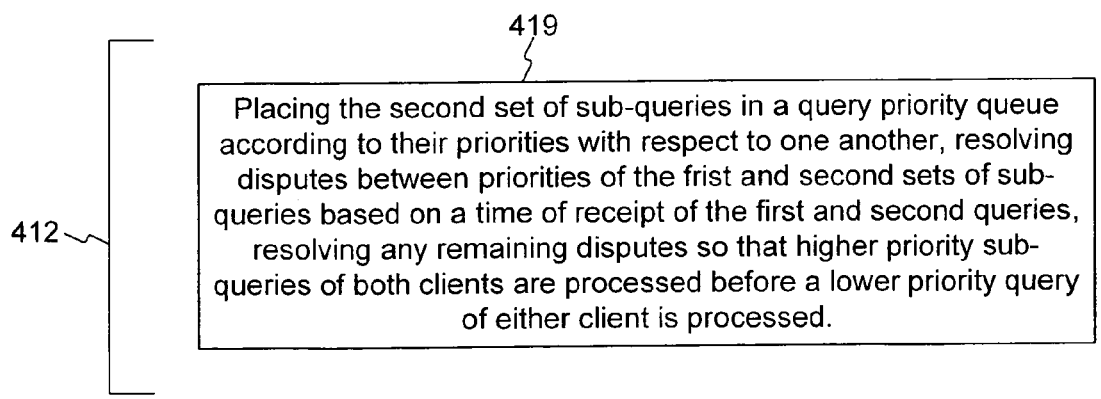
FIG. 4D illustrates an example implementation of step 412 from FIG. 4A.

Additional or alternative rules can be implemented for a situation where multiple client queries are received at the same time. For example, and without limitation, FIG. 8 illustrates an example placement scheme whereby simultaneously received client queries are processed so that no client's second priority sub-query is processed before the first priority sub-queries from simultaneously received client queries are processed. This example is provided in the later portion of step 412, which includes resolving remaining disputes based on the priorities of the sub-queries with respect to the other sub-queries. FIGS. 4B-4D illustrate example implementations of step 412.

Figure 9:
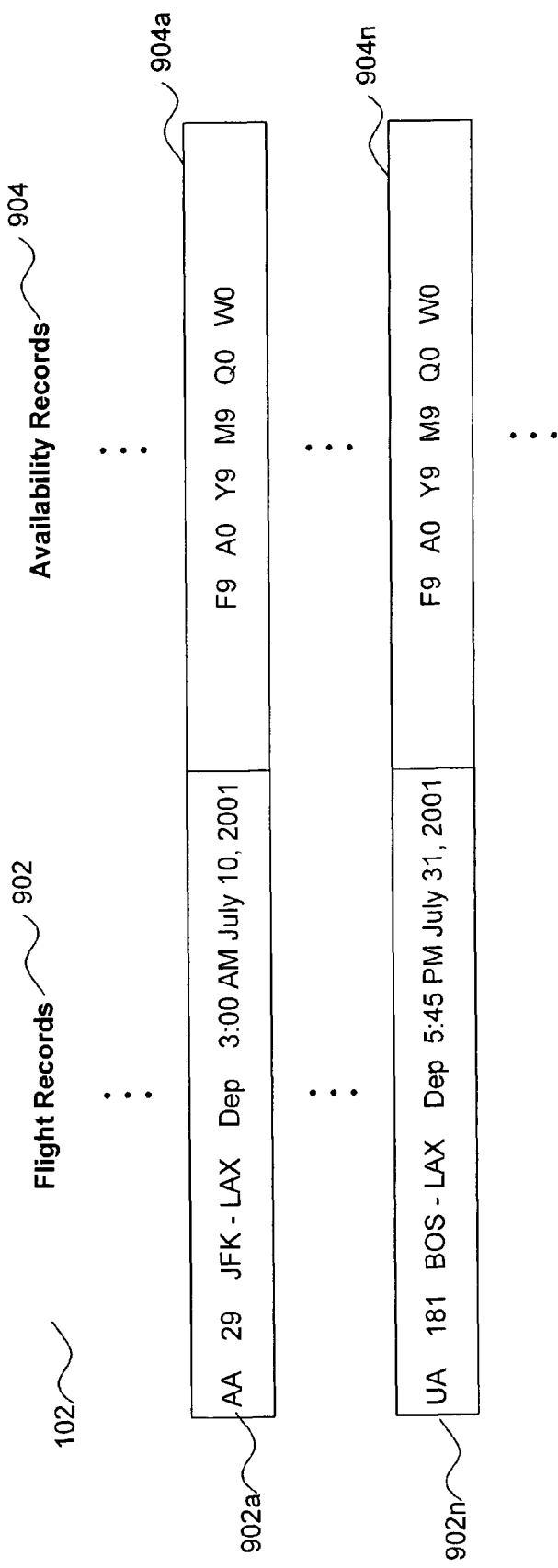
FIG. 9 illustrates example flight records and corresponding example flight count availability records.

Alternatively, or additionally, some clients may be provided with preferential treatment, whereby, for example, a preferred client query may be placed higher in the query priority queue than other clients. This can be implemented where the preferred client query is received at the same time as the other client query, or even where the preferred client query is received later than the other client query.

Where proactive queries are implemented in accordance with the invention, as described elsewhere herein, additional rules can be provided for adding them to the query priority queue. Generally, proactive queries are added to the query priority queue below all client queries, as illustrated in the examples of FIGS. 8 and 9. Proactive queries are ordered relative to one another using one or more a variety of rules, described elsewhere herein.

III. Caching

In an embodiment, the present invention caches information from information sources 304. As used herein, the terms "cache" and "caching" mean storing query results.

Cached information can be utilized for a variety of purposes. For example, in an embodiment, cached information is used to respond to future client queries. Other uses for cached in formation are described below.

Consider the following scenario: a first client poses a query to an airline AVS about American Airlines flight 29 from JFK to LAX on Jun. 12, 2000. The airline AVS consults a real time information source such as a CRS to retrieve availability information for this flight and returns the result to the client. The airline AVS also stores the result in a storage device, such as a cache, which can be a database, for future reference. Some time later, a client, which may be the first client or a second client, asks for availability information for the same American Airlines flight. At this point, the airline AVS can answer "out of the cache" without consulting any real time data source, by simply returning the same answer it returned before.

Since access to real time availability data sources is generally limited, answering out of the cache greatly increases the number of queries that can be processed in any given time. Furthermore, answering out of the cache can be implemented using simple memory operations, making it many times faster than retrieving the same information from a real time data source, which often encounters communication and processing delays.

Information to be cached may be obtained in one or more of a variety of ways. In the example above, when an information source is queried in response to a client query, the information that is returned from the information source is both sent to the client and cached for future use.

Alternatively, or additionally, information to be cached may be obtained through proactive queries. Proactive queries are queries that do not necessarily correspond to a particular client query. For example, proactive queries can be used to populate a cache.

This can be accomplished, for example, by generating queries for a list of future flights.

Proactive queries can also be used to update currently cached information. Proactive queries are described below.

Alternatively, or additionally, information to be cached may be obtained by snooping, or monitoring traffic between one or more information sources and third parties. Some or all of the monitored traffic can be cached for later use.

The various caching embodiments described herein make significantly more information available to clients than would otherwise be available through conventional bandwidth limited information sources and/or bandwidth limited communications mediums to the information source(s).

Cached information can be used for purposes other than, or in addition to future client queries. For example, and without limitation, cached information is used to learn one or more processes used by the information source. For example, in an airline AVS implementation, cached information can be used to learn a yield management system that an airline utilizes to set/change availability records. Based on the description herein, one skilled in the relevant art(s) will understand that cached information can be used for other purposes as well. Such other purposes are within the scope of the invention.

A. Specifying Cache Use in Queries

Cached information may become untrustworthy after a time. Such information is referred to as stale information. For example, when availability information is cached for a flight that subsequently sells out, future queries answered out of the cache will incorrectly indicate that seats are still available on the flight.

The age of cached data can thus affect its value for some applications, like low fare searching. In an embodiment, therefore, the invention marks availability information it returns out of the cache with the age of the data, such as with the number of minutes since the information was retrieved from a real time data source.

In an embodiment, clients are permitted to specify how cached information can be returned to the client. For example, flight and/or market availability query formats can be structured to allow clients to specify how the cache is to be used in answering the query. Alternatively, or additionally, a server in accordance with the invention includes logic and/or other determinative means to determine whether to return real time information, cached information, or a combination of real time information and cached information.

Example strategies include, without limitation:
return real time data only (do not consult the cache);
return cached data only;
return cached data if available, otherwise consult real time data source; and
return cached data if less than N seconds old, otherwise consult real time data source.

One or more of those strategies and/or other strategies may be specified by clients and/or implemented by a server in accordance with the invention. Based on the description herein, one skilled in the relevant art(s) will understand that other strategies may be used as well. Such other strategies are within the scope of the present invention.

In an embodiment, clients are permitted to repeat a query several times, using a different strategy each time. For example, in an embodiment, a client is permitted to first pose a query requesting cached data only (a request that can be fulfilled very quickly since it requires access only to the RAM-based cache and no external sources). The client may then re-pose the query, or a related query, requesting real time data only. For example, the client may pose a related query for flights whose cached data the client deems too old to be trusted. This process is referred to herein as multi-pass logic. In an embodiment, this multi-pass logic is incorporated into a server.

B. Treating Recently Cached Data as Real Time Information

Generally, real time data is more expensive to obtain than cached data, in terms of processing time and/or access fees. Moreover, recently cached information is generally still new enough to consider real time information. In an embodiment, therefore, the invention uses recently cached information in place of real-time information.

For example, in an embodiment, a server in accordance with the present invention utilizes a recently-cached-information-cache, separate from a main cache. The recently-cached-information-cache is generally smaller than the main cache and generally includes information that was retrieved in the recent past, for example, in the past minute or so. The recently cached information is then treated as real time information.

In operation, when a client or server process seeks real time data, the server can then look to the recently cached information cache instead of re-querying the information source(s). This noticeably reduces the number of live queries. Such a policy can be implemented through a query caching type specification (i.e., at the client's request only) or can be enforced without the clients' knowledge.

Use of recently-cached-information-cache can also be linked to other factors, such as the identity of the client. For example, use of real time data sources could be restricted to certain favored clients.

C. Implementing a Cache

Information from one or more information sources can be cached using a variety of caching techniques. In an example embodiment, a cache is implemented with a hash table. A hash table is a data structure for which a mathematical hash function assigns a numerical hashing index to each piece of data to be stored in the hash table. The hash or hashing index determines where the data will be stored in the hash table. For example, an index of 3 might indicate that the data is stored as the third entry in the hash table.

In the case of an availability server, the hash function takes as input details about a flight (airline, flight number, departure time, and so on) and produces a numerical index.

To add a flight to the cache, the server simply applies the function to get the hashing index and adds the flight to the hash table in the corresponding place.

One or more policies can be utilized in the event that data is already at the hashing index. For example, the existing data can be over written with the more recent data. Other policies are possible.

To retrieve information from the cache (if there is any), the server applies the hash function to the target information and examines the entry in the table corresponding to the resulting numerical index. If no information has been cached, that spot in the table will be vacant.

A hashing function may, from time to time, map two different sets of target information to the same numerical hashing index. One or more polices can be implemented to handle this situation. Hashing tables and hashing functions are generally well known in the relevant art(s). Based on the description herein, one skilled in the relevant art(s) will be able to implement one or more policies to handle this and other situations.

D. Approximate Time Matching

In an embodiment, the invention permits requires users to pose queries using actual departure and/or arrival times. In an other embodiment, the invention permits users to pose queries using actual and/or approximate departure and/or arrival times.

For example, in an embodiment, an airline AVS permits users to pose queries using approximate, desired, and/or guessed departure and/or arrival times. In an embodiment, the AVS will match a flight if the client approximated, desired, and/or guessed departure and/or arrival time is within a predetermined range or variance of an actual flight time. In an embodiment, the predetermined time is less than or equal to plus or minus one hour. Other predetermined times can be used.

In an embodiment, a hash table, such as the previously described hash table, is programmed to implement approximate time matching. For example, in an embodiment, when caching airline availability information, a pre-hash function rounds actual departure and/or actual arrival times down to the nearest hour (or any other reasonable quantum). A hash function receives as input at least the rounded down times and generates a hash table location, or index, to store the actual availability information. The actual availability information, including actual departure and/or arrival times, are then stored at the resulting rounded-down hash table entry.

When searching for flight information in response to a query, the pre-hash function takes as input the client's approximated, desired, and/or guessed departure and/or arrival, and rounds them down to the nearest hour (or any other reasonable quantum). The hash function receives as input the rounded-down times and generates a hash table location, or index. The server then searches for flight information at the resulting rounded-down hash table entry. If information is found at the resulting rounded-down hash table entry, the actual departure and/or arrival times are obtained from the hash table entry and returned to the client.

For example, if an actual departure time is 4:20 p, the pre-hash function would round this down to 4:00 PM. If times are implemented as seconds or minutes elapsed from a particular date (as is generally the case in computer programs), rounding to the nearest hour can be implemented using a standard integer floor operation. Note that the data stored in the hash table contains the correct departure time. The pre-hash function, which, in practice, can be implemented as part of the hash function, merely performs the rounding "in passing" so the departure time data itself is not actually stored rounded.

Suppose a client requests information for a flight leaving at 4:02 PM, when in fact, the flight departs at 4:30 PM. The hash function will treat 4:02 PM as 4:00 PM and generate a numerical index as though the departure time were 4:00 PM. Fortunately, the hash function will have done the same for the actual 4:30 PM departure time, so when the server looks in the corresponding location in the table it will find the 4:30 p flight.

In an embodiment, the processes described above are also performed for rounded-up arrival and/or departure times. This improves the chances of matching approximated flight times with actual flight times. For example, when a client thinks a flight time is 3:59 PM, when in-fact the flight is at 4:00 PM, the example scheme above will round the client entered time to 3:00 PM.

Thus, in an embodiment, when storing availability information, the pre-hash function also rounds actual departure and/or actual arrival times up to the nearest hour (or any other reasonable quantum). The hash function then receives as input at least the rounded up times and generates a hash table location, or index to store the actual availability information. The actual availability information is then stored at the resulting rounded-up hash table entry.

When searching for flight information in response to a query, the pre-hash function takes as input the client's approximated, desired, and/or guessed departure and/or arrival, and also rounds them up to the nearest hour (or any other reasonable quantum). The hash function then receives as input the rounded-up times and generates a hash table location, or index. The server then searches for flight information at the resulting rounded-up hash table entry. If information is found at the resulting rounded-up hash table entry, the actual departure and/or arrival times are obtained from the hash table entry and returned to the client.

The examples provided herein are provided to assist the reader in understanding the invention. The invention is not, however, limited to the examples herein. Based on the description herein, one skilled in the relevant art(s) will understand that approximate time matching can be implemented with other methods. Such other methods are within the scope of the present invention.

E. Memory Saving Techniques

Optional memory saving techniques are presented below. When a hash table is utilized, one or more of the memory saving techniques can be implemented to reduce the amount of memory used by the hash table. However, the memory saving techniques are not limited to utilization in hash tables. Based on the disclosure herein, one skilled in the relevant art(s) will understand that the memory saving techniques presented herein can be utilized in other implementations of the invention as well.

1. Sharing Availability Information Among Multiple Flight Records

Flight availability information is typically recorded as availability count records.

An availability count record is typically a listing of how many seats are available at each price level or booking class. A typical availability count record might look like "F9 C9 Y2 Q1 V0 W0", indicating that 9 seats are available in F class, 9 seats are available in C class, 2 seats are available in Y class, and so on. There are many possible availability count records. Theoretically, any letters and/or numbers 0-9 can occur. However, only a relatively small number typically occur in practice. This is because seat counts like 0, 1, and 9 are much more common than seat counts like 3 or 8. Likewise, booking code Y occurs much more frequently than booking code Z. These facts arise from various travel industry conventions. So while the number of potential availability count records is vast (e.g., billions), in practice, only several hundred thousand typically occur. While several hundred thousand is still a large number, it is much smaller than the number of flights departing in the next year, which is typically several million.

FIG. 9 illustrates example flight records 902 and corresponding example flight count availability records 904. Flight count availability record 904a corresponds to flight record 902a. Flight count availability record 904n corresponds to flight record 902n. In this example, flight count availability records 904a and 904n are identical.

In an embodiment, a separate flight availability count record is stored for each flight record. For example, when a hash table is utilized, a separate flight availability count record is stored for each flight in the hash table.

In an alternative, memory saving embodiment of the invention, availability information is shared among multiple flight records. For example, one copy of an availability count record can be shared among multiple flight availability count records.

In an embodiment, flight availability count records are shared using memory pointers.

Figure 10:
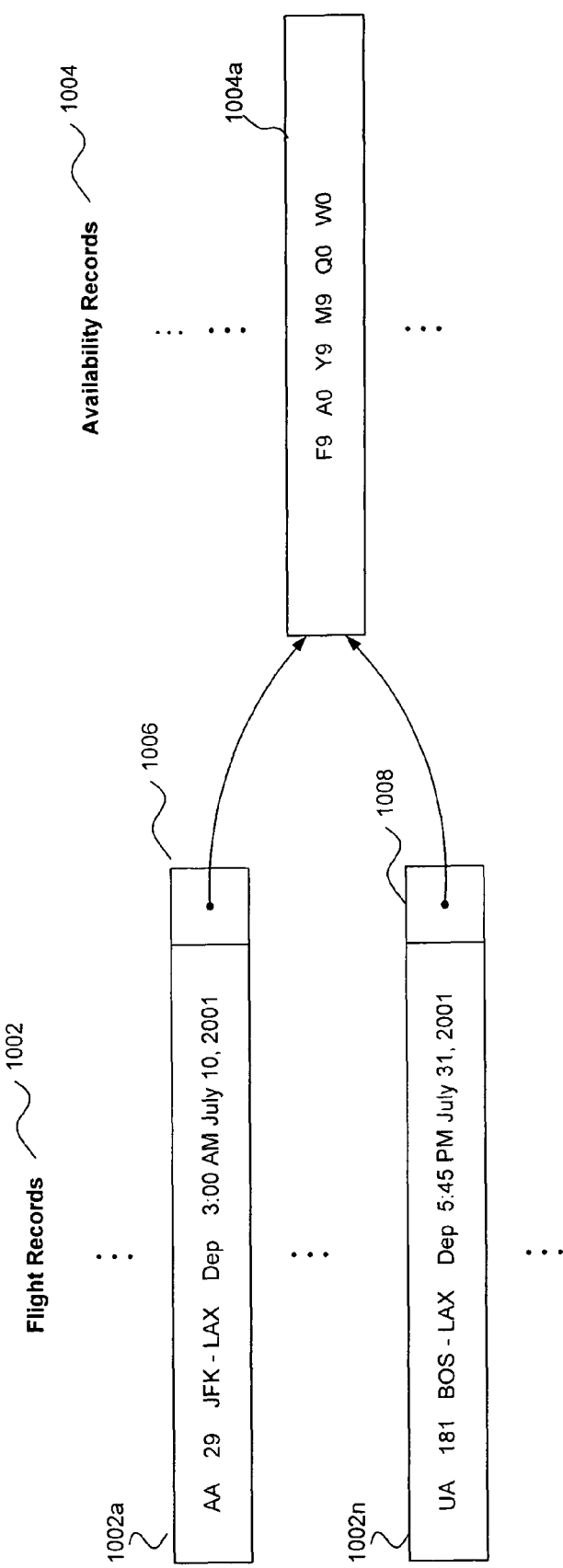
FIG. 10 illustrates an example of using memory pointers to share flight availability count records among multiple flight records, in accordance with the invention.

FIG. 10 illustrates an example of using memory pointers to share flight availability count records 1004 among multiple flight records 1002. In this example, flight records 1002a and 1002n include pointers 1006 and 1008, respectively, to a flight availability count record 1004a. Additional flight records 1002 can also include pointers to flight availability count record 1004a, or to other flight availability count records 1004.

In an embodiment, flight availability count records are stored in a flight availability count record hash table. Preferably, flight records are not stored in the flight availability count record hash table. In operation, when a flight availability count record is received in response to a query, the flight availability count record is fed to the corresponding flight availability count records hashing function, which identifies a hash table index where the flight availability count record would be stored. If the flight availability count record is already stored at the identified hash table index, there is no need to store it again. Instead, the flight record that corresponds to the query is provided with a pointer to the hash table index. If the flight availability count record is not already stored at the identified hash table index, it is stored at this time.

2. Sharing Information Among Married Records

In some environments, two or more records are married with one another. For example, and without limitation, in travel related industries, such as the airline travel industry, married travel segments are often utilized. A married travel segment is a combination of several travel segments, (e.g., flights), which together constitute a single unit for purposes of availability, such as seat availability.

For example, suppose American Airlines offers connecting service from JFK to San Diego via Dallas. This means a customer can purchase a single ticket for travel from JFK to San Diego, even though there are two different flights involved. For revenue management purposes, American Airlines may value passengers traveling from JFK to Dallas differently from those traveling from JFK to San Diego via Dallas, even though both types of passengers may fly on the same flight from JFK to Dallas. For example, the airline might be willing to sell a seat in an inexpensive booking class like Q only to a passenger who will continue on to San Diego. The airlines enforce such restrictions through seat availability.

An availability record for multiple travel segments is referred to herein as a married segment availability record. Where the invention is implemented as an airline availability server, it preferably caches married segment flight information in addition to information for single, or point-to-point flight records.

Married segment availability records are typically quite numerous. There are potentially as many married segment availability records as there are flight combinations. In an embodiment, therefore, married segment records share flight records (e.g., airline, flight number, departure time, and so on), and/or flight availability records with unmarried flight segments.

For example, in an embodiment, flight records and availability information are stored hierarchically, where point-to-point and married segment availability records share both flight information records and availability count records. In an embodiment, this is accomplished with pointers.

Figure 11:
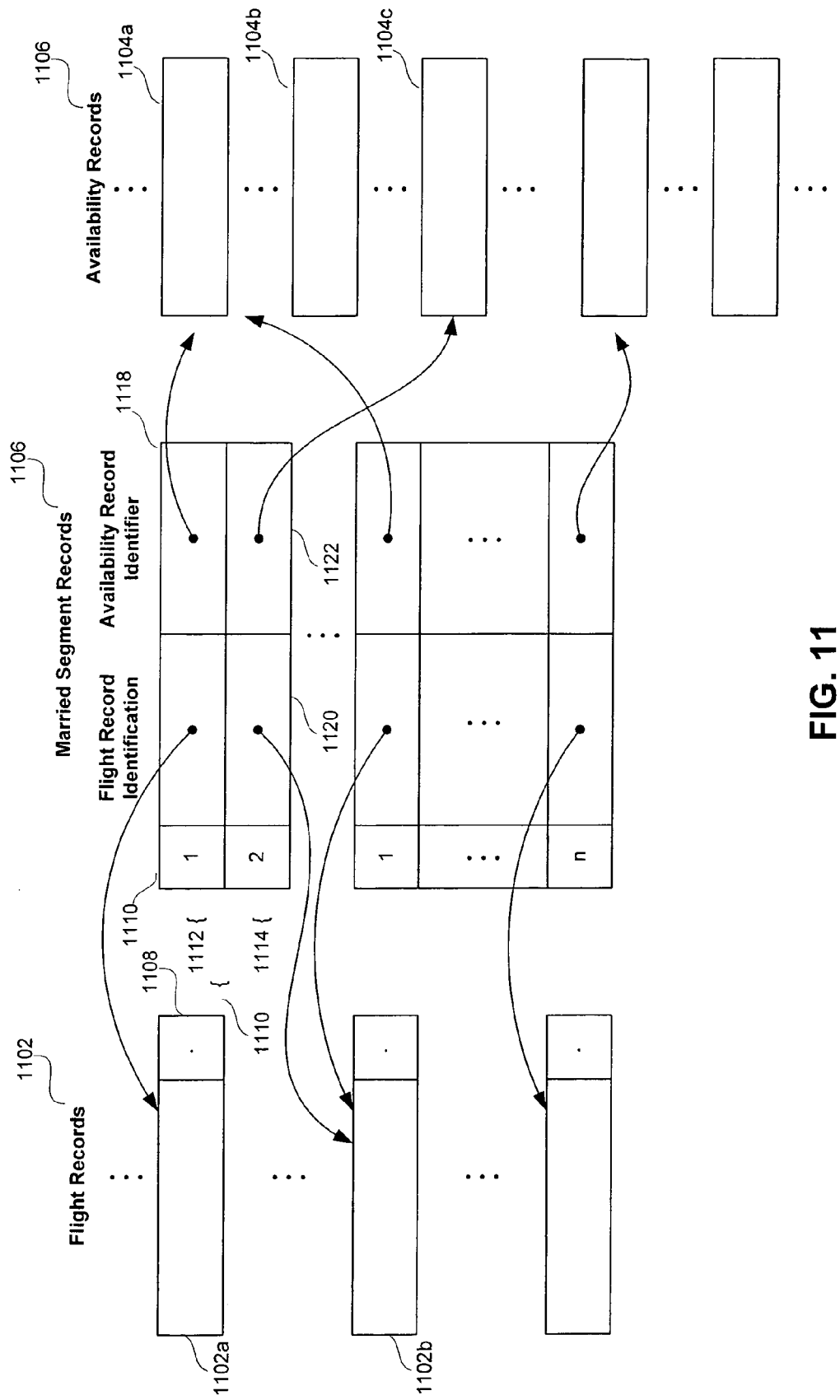
FIG. 11 illustrates an example implementation of sharing flight records and flight availability count records among married segment records, in accordance with the invention.

For example, FIG. 11 illustrates an example implementation of sharing flight records 1102 and flight availability count records 1104 among married segment records 1106.

As an initial matter, in the example of FIG. 11, the flight records 1102 include pointers 1108 to flight availability count records 1104. This allows two or more flight records 1102 to share a flight availability count record 1104. In a less efficient implementation, a separate flight availability count record 1104 could be stored for each flight records 1102.

In the example of FIG. 11, married segment records 1106 share flight records 1102 and flight availability count records 1104 as follows. A married segment record 1110 includes a first flight segment 1112 and a second flight segment 1114. First flight segment 1112 includes a flight pointer 1116 to flight record 1102a, and an availability pointer 1118 to a flight availability count record 1104a. Second flight segment 1114 includes a flight pointer 1120 to flight record 1102, and an availability pointer 1122 to a flight availability count record 1104c. A flight availability count record 1104 can be shared by two or more flight records 1102, by two or more flight records of married segment records 1106, and/or by one or more flight records 1102 and one or more flight records in married segment records 1106.

FIGS. 10 and 11 illustrate example schemes for sharing flight availability count records. Based on the description herein, one skilled in the relevant art(s) will understand that other schemes can also be implemented. Such other schemes are within the scope of the present invention.

3. Availability Information Compression

In an embodiment, flight records and/or availability records, whether shared or not, are stored in a compressed form. Compressed records are decompressed when accessed. Although this tends to increase CPU requirements of the availability server, it has been determined that it can reduce memory requirements by a factor of 5 to 10, even when unused records are not purged. Many standard compression algorithms will work for this purpose, including, without limitation, Lempel-Ziv.

F. Preserving Cache Across Program Invocations

In an embodiment, availability information is maintained in local memory only, where, after the server program is terminated, the availability information is lost.

For a number of reasons, it may be desirable to maintain availability information after an availability server terminates. This requires storing availability information, such as the data structures generated and/or utilized in accordance with the invention. The server can save availability information in a number of ways.

In an embodiment, the server is configured to append availability information to a file whenever it receives an answer to a query to a real time (or other authoritative) data source. This is referred to herein as an incrementally written log. In an embodiment, the appended information is encoded and optionally compressed as previously described. The incrementally written log file is a running history of the availability information the server received during its lifetime. From such a log, a new invocation of the server can reconstruct the availability cache as of the time it terminated. Further, since the entries are time-stamped, the log provides a means to determine what availability information was available at any point in the time spanned by the log. This can be of use for applications that require historical data, such as ticket re-pricing.

In an alternative embodiment, or additionally, the server writes out a log file all at once, rather than incrementally. In this mode the server steps through every entry in its cache (e.g., hash table(s), writing the cached availability information for each flight as it goes. The resulting log file has the same format as the incrementally written log file, except that it is generally smaller since only the newest query result for each flight is stored in the file. This method thus produces files that are can be more quickly read by future server invocations.

G, Prioritizing Client Sub-Queries for Processing Based On One Or More Caching Related Factors Recall that sub-queries can be prioritized for processing according to, among other things, client assigned priorities. In addition to, or alternatively when the requested information is currently available in cache, sub-queries can be prioritized for processing based on one or more cache-related factors. For example, and without limitation, sub-queries can be prioritized based, in whole or in part, on age of the cached data, time to departure, frequency of prior availability changes, importance of market, and/or combinations thereof.

In an embodiment, therefore, an initial determination is made as to whether requested information currently resides in a cache, and, if so, cached information is used to prioritize the query for processing.

H. Authentication

Since access to real time data sources is typically quite limited, and potentially expensive, it is sometimes desirable to limit access to real time information sources to certain privileged clients. Similarly, CPU limitations may dictate limiting the number of queries if various types that certain clients can send.

Thus, in an embodiment, the invention authenticates clients. That is, it unambiguously identifies a client and therefore determine its level of access. Any of a variety of conventional authentication techniques can be utilized. In an example implementation, a client's identity is keyed to a network connection through which the client accesses the server.

Access control can be enforced according to a global policy set a priori, or could be determined dynamically. For example, access to some clients could be limited when the server is very busy.

IV. Proactive Querying

In an embodiment, one or more information sources are queried proactively and the results are cached. As used herein the term proactive querying means querying without necessarily being prompted by a user query.

Real time data sources are often busier at certain times of day than other times.

The idle times often correspond to those times when the availability server's clients may also be relatively idle. Proactive querying can take advantage of less busy times.

Proactive querying can be performed for a variety of purposes. For example, in an embodiment, proactive queries are generated to populate a cache or a portion thereof. For example, assume that no client has ever asked for availability for American Airlines flight 29 from JFK to Los Angeles on June 12. Then the first client that asks for that flight will have to wait for a live query to be posed, or will not get any information about that flight. Proactive querying in anticipation of future client queries tends to reduce client response time.

Alternatively, or additionally, proactive queries are generated to update previously cached information.

Thus, in order to make the most of the bandwidth of the information sources during the idle periods, and to ensure that the cache will be filled with a reasonably representative set of flights, the server proactively populates and/or updates the cache.

In an airline availability implementation, a cache can be proactively populated by taking a list of future departing flights, such as flights departing over the next year. This can be accomplished using an industry standard SSIM file from which an airline AVS can generate a list of future flights as illustrated by element 312 in FIG. 3.

Alternatively, or additionally, when updating presently cached flight information, the server can prepare a list of presently cached flights.

Once the server has a list of flights to proactively query, the airline AVS preferably orders the proactive queries according to some measure of importance. In an embodiment, the airline AVS adds the corresponding flight availability queries to the previously described query priority queue, with priority levels for proactive queries set lower than the lowest priority client-generated query. The lower priority setting for proactive queries helps to ensure that proactive cache filling will not steal resources from client-generated queries. Additional and/or alternative methods for ordering proactive queries are provided below.

A proactive query generating process can be implemented as one or more background threads whereby an availability server repeatedly composes client-style availability messages and sends them to itself.

There are many ways to proactively query. Example methods are provided herein. However, the present invention is not limited to the examples provided herein. Based on the description herein, one skilled in the relevant art(s) will understand that proactive querying can be implemented in a variety of ways, which are within the scope of the invention.

A. Proactive Query Ordering

In an airline AVS implementation, the effectiveness of proactive cache filling depends on how the flights are ordered with respect to one another.

In some cases, it may be desirable to filter out certain flights entirely. For example, flights for which there are no corresponding fares need not be queried. Corresponding fares may not be available for a number of reasons. For example, an airline AVS may not have access to an information source that has corresponding fares.

Alternatively, corresponding fares may not be available on an information source. It may also be useful to filter out flights on carriers that are unsupported by an airline AVS or by any proxies associated therewith. Proxies are described below. It may also be useful to filter flights which clients are not expected to request.

Example factors that can affect the ordering of the remaining flights are described below.

In an embodiment, proactive queries are ordered for processing at least in part based on a market. For example, a flight from JFK to Los Angeles might need updating more often than a flight from Anchorage, AK to Nome, AK, because its availability status may have been observed to change much more frequently, statistically speaking. More generally, some markets may be viewed as more important than others.

In an embodiment, proactive queries are ordered for processing based, at least in part, on nearness of departure time. For example, it might be more important to update a flight departing in the next 24 hours than to update one leaving four months hence.

In an embodiment, proactive queries are ordered for processing based, at least in part, on the age of or lack of cached data. For example, if the cached data for a flight is old, or if there is no data cached for the flight, this may make it more important to update the flight.

In an embodiment, proactive queries are ordered for processing based, at least in part, on one or more properties of cached data. For example, aspects of previously acquired availability information for a flight may make it more or less important to update information for the flight. For instance, it may be desirable to update a flight sooner if there is exactly one economy seat left than if the plane appears to be relatively empty.

In an embodiment, proactive queries are ordered for processing based, at least in part, on holidays and special events. For example, a flight departing during a holiday or other period where many people travel may need to be updated especially frequently. For special events, this may be specific to certain markets. For example, if the Super Bowl is taking place in San Francisco on a given day, flights to San Francisco near that period may need more frequent updating, while flights to other places may not.

In an embodiment, proactive queries are ordered for processing based, at least in part, on equipment type. For example, it may be desirable to update "flights" that are actually ground transportation (buses and so on) or on small propeller planes less frequently than those on jet aircraft and/or higher capacity planes, the idea being that availability tends to change less frequently on flights with fewer passengers.

1. Example Implementation—Mathematical Function

In an embodiment, records for proactive querying are encoded into a mathematical function that assigns a numerical priority value to every flight. The list of flights is periodically sorted according to the mathematical function and the highest priority flight is removed for processing.

2. Example Implementation—Bucketing

In an embodiment, records for proactive querying are ordered using a bucketing approach. This strategy involves dividing the flights into a relatively small number of groups called buckets. For example, the flights might be separated into 7 buckets, each corresponding to a continuous range of departure times, like so:
Bucket 1: departures in the next 24 hours;
Bucket 2: departures between 24 and 48 hours hence;
Bucket 3: departures between 48 and 72 hours hence;
Bucket 4: departures between 72 hours and one week hence;
Bucket 5: departures between one week and one month hence;
Bucket 6: departures between one month and three months hence; and
Bucket 7: departures more than three months hence.

Within each bucket, flights can be unordered with respect to departure time, but strictly ordered according to some secondary criteria, such as age of cached data, market, and so on. This scheme has the advantage that as the number of buckets is increased, the number of flights in each bucket decreases. Therefore operations like sorting become more feasible as more buckets are defined.

There are many ways to vary the bucketing strategy. For example, criteria defining the bucket boundaries and the ordering within each bucket, and data structure(s) used to represent each bucket can be varied to achieve specific performance properties. The following section describes an example embodiment. Based on the description herein, one skilled in the relevant art(s) will understand that other bucketing approaches can also be utilized.

B. Algorithms and Data Structures for Bucketing

In an embodiment, each bucket is represented by a priority queue implemented using a data structure, like a Fibonacci Heap, that supports efficient removal of items within the queue. As described above, flights are assigned to a bucket based on one or more initial factors, such as, for example, departure time. Within each bucket or queue, flights are prioritized according to one or more additional factors, such as, for example, an age of the corresponding cache data. For example, a flight whose availability was updated five days ago would be more highly prioritized than another flight within the same bucket whose availability was updated five minutes ago.

Furthermore, assume that each departure time bucket has an associated desired update interval. For example:
Bucket 1: update every hour;
Bucket 2: update every two hours;
Bucket 3: update every eight hours;
Bucket 4: update every 24 hours;
Bucket 5: update every 48 hours;
Bucket 6: update every week; and
Bucket 7: update every week.

Then an algorithm, such as the following algorithm, will enumerate the N flights that most urgently need updating:

```
for I = 1 to 7:
    while the top element of queue I has not been updated
    recently enough:
        pop the element off the queue
        add to list of elements to update
        if the list contains N elements, then DONE
```

This algorithm favors sooner departures over later departures, except where a flight has been updated recently enough for its bucket. Note that since within each bucket the flights are kept sorted by the age of the corresponding cached data, it is only necessary to look at the top of the priority queue, not the entire contents of the queue. If the element on the top of the queue has been updated recently enough, then all other queue elements will have been as well.

This data structure and algorithm reasonably approximate the much more expensive method of sorting the entire set of flights first by departure time and then by age of data. Additional implementation details are now described.

When flights are bucketed by departure time, flights should be moved from bucket to bucket as time passes. One way to implement this is to have one or more background threads constantly traverse each bucket, removing flights that depart too soon for the bucket they are in, and inserting these flights into their proper buckets. Where a Fibonacci or similar heap is used to implement the priority queues, the process is reasonably efficient. However, performance is not critical and other methods can be utilized. For example, suppose that it takes the thread 5 minutes to evaluate flights in every bucket. Then, flights will be out of date with respect to their buckets by, at most, five minutes. In practice, this will generally be sufficient.

Another implementation detail is maintaining the order of the flights within each bucket. Generally, the priority queues keep their elements sorted according to the elements' priority values. However, in some situations, priorities of already inserted elements can change, thereby violating the ordering.

For example, when availability information is updated for a flight as the result of a client's query, for example, that flight will no longer be properly prioritized. Therefore, when such an update occurs, the corresponding flight should be removed from its present priority queue and reinserted based on nearness to departure time and age of cached data. Often, a flight will be inserted at the end of its present bucket since its cache data will be the most up to date, unless a change in the nearness to departure time dictates another bucket. This insight allows a slightly more efficient implementation.

Another implementation detail is locating a desired flight record. In other words, after a flight has been inserted into a queue, there should be a way to retrieve it, as well.

This includes identifying a queue and finding the flight within the queue. In an embodiment, therefore, the invention includes a facility for looking up a flight given its properties (e.g., airline, flight number, and so on). In an embodiment, the facility includes a hash table. For example, when the availability server starts up, it can create a memory record for each flight departure in the next year, or other suitable interval, and hash all of the records into a hash table. In the future, the hash table records are neither added to or removed from. The records in the hash table are the records that get added to the priority queues. When availability information is updated for a flight, then, the server can hash the flight's properties to find the corresponding hashed flight record and, by extension, the queued element itself. Thus each flight record is simultaneously stored both in the hash table and in one of the priority queues. In some cases it may make sense to use the availability cache itself as the hash table. This eliminates the need for a separate hash table.

In an alternative embodiment, one or more dynamically sizeable hash tables are employed.

C. Mathematically Determining Bucket Parameters

In the bucketing approaches described above, values for a number of variables should be determined, including the number of buckets, the range of departure times covering each bucket, and the desired update interval for each bucket. In an embodiment, optimum values for these parameters are mathematically determined.

D. Incorporating Other Ordering Criteria

The previous sections describe methods for selecting flights that most urgently need updating, where selection criteria include time of departure and age of cached data.

As discussed above, it may be useful to incorporate other information, e.g., market, properties of cached data, holidays, special events, and/or equipment type, into the relative ordering of flights to be queried. Example strategies are described below.

Override or adjust the assignment of flights to buckets based on one or more factors. For example, in order to reduce the frequency of updates for ground transportation "flights," override the normal bucketing rules and force all ground transportation flights that would be bucketed in buckets 1 through 4 into bucket 4.

In an embodiment, multiple sets of buckets are provided. To treat some markets differently, for example, have one set of buckets for major markets (NYC-LAX) and one for minor markets (ANC-OME). There are various ways to apportion work between the different bucket sets. One simple way is to pick one flight from the minor market bucket set for every three flights chosen from the major market bucket set. This effectively devotes 75% of the availability resources to the major markets and 25% to the minor markets.

E. Incorporating Availability Information from Multiple Information Sources

Similar information is sometimes available from multiple information sources. In an embodiment, therefore, similar information is retrieved from multiple information sources.

Sometimes, the accuracy of information varies among different information sources. Therefore, in an embodiment, multiple records are used to store similar information obtained from multiple information sources.

For example, in an airline availability environment, multiple availability records are used to store availability information for a flight, when availability information for the flight is obtained from multiple information sources, whereby a separate availability record is provided for each information source. In other words, a single flight record may be associated with multiple availability count records.

When flight availability information is requested for the flight, information from a lower-quality information source is used when information from a higher-quality information source is absent or out of date.

Additionally, or alternatively, lower-quality information can be used in ordering proactive queries, which are described above.

Various example types of information and information sources include, without limitation:

AVS messages;
direct supplier connections;
packet sniffing;
special fares;
predictive models;
yield management simulation;
yield management prediction; and
inference based on other queries.
These are described below.

AVS Messages. AVS message are an old airline industry protocol for obtaining flight availability information from airlines. Whereas real-time availability involves posing live queries to airlines (often via a CRS), airlines transmit AVS messages proactively. For example, when a flight sells out, an airline will issue an AVS message updating the availability counts appropriately.

Direct Supplier Connections. Airlines and other suppliers may provide access to availability information via proprietary protocols.

Packet Sniffing. In some cases it is possible to monitor availability queries posed by other entities and to incorporate the results of these queries. For example, the availability server could monitor traffic on a network used by travel agents to query availability through a CRS. By identifying the availability queries and "screen-scraping" the responses, the server can incorporate availability for every flight the travel agents request (in aggregate).

It is also possible to incorporate availability information generated in a variety of ways. In each of these cases, the availability server manufactures availability records and caches them. In some cases, it may be necessary to run a background thread that updates the generated availability records according to external factors (time until flight departure, for example).

Availability for Special Fares. Some fares—such as negotiated fares, internet-only or so-called "white label" fares for distressed inventory—may be available according to particular rules. For example, a white label fare may be available on a particular flight at a particular time before departure. Or an internet fare may be available at any time to high-mileage frequent fliers.

Predictive Models. It is possible to model airline revenue management and predict availability with some degree of error using various machine learning methods.

Yield Management Simulation. If a supplier provides information about its yield management policies and access to the real-time inputs to the yield management system (such as inventory), the server can predict seat availability perfectly. It can periodically update generated cached availability using this method, or simply compute availability information on demand, depending on CPU requirements.

Yield Management Prediction. Even if the supplier cannot or will not provide the necessary information to perfectly simulate the yield management system, it may be possible to infer this information using statistical or machine learning methods.

Inferring Information from Other Queries. Other kinds of queries besides availability queries may indirectly provide information about availability. For example, it may be possible to infer information about seat availability on a particular flight from the seat map for that flight. For example, if every seat on the flight is empty, it may be sensible to assume that seats are available at expensive rates.

V. Information Source Management

In an embodiment, connections to real time data sources are managed in order to optimize throughput to them. Optimization can include maximizing throughput and/or controlling throughput according to one or more factors such as time of day, for example. In an embodiment, these connections are via proxies that in turn communicate with the information systems—whether at a CRS, airline, or other entity—that provide availability information.

For historical reasons, in the airline industry, proxies are often travel agent terminals. Because such terminals are intended for use by people and not computers, they often impose fairly severe limits on the number of queries that can be posed through them —usually a query every one or two seconds. In order to pose large numbers of availability queries, the availability server preferably aggregates many such proxies.

A. Proxy Interface

Each proxy connects to a host information source, via some (usually proprietary) protocol. Where multiple information sources are to be accessed, multiple proxies may have to be employed, each designed for a different protocol. In an embodiment, multiple instances of a protocol can be initiated as needed. In order for an availability server to access different proxies using a uniform protocol, each proxy is preferably augmented with a server interface software and/or hardware. The interface software and/or hardware acts as a gateway between a server protocol (such as TCP/IP over sockets) and the proxy. To do this, the interface software/hardware accepts messages from the availability server, relays the messages to the proxy, and sends back the replies to the availability server. This interface software/hardware is preferably designed for each type of proxy that will be connected to the availability server.

1. Determining Which Proxies are Available

One or more proxies may fail for various reasons. Likewise, over the lifetime of an availability server, proxies may be added or removed from the network. In an embodiment, therefore, the availability server probes the network to find available proxies, and internally maintains the state of each. This can be accomplished by adding support for various status commands to the proxy interface software/hardware. For example, with one such status command, the availability server can ask a proxy whether it is available to answer queries. The availability server can send such a message to each port (within an agreed-upon range) on each potential proxy on the local network. If a proxy answers, it is added to the pool of available proxies. If the proxy fails to answer in a reasonable amount of time, it is assumed to be down.

Similarly, proxy response times can be measured, such as the response time of a proxy to retrieve information from an information source.

Preferably, the proxy probing process is repeated continuously.

2. Proxy Priority Queue

In an embodiment, the availability server maintains a record for each proxy. For example, records for proxies that are up and idle are kept in a proxy priority queue, preferably sorted by measured performance properties. For example, proxies that respond faster typically have precedence over those that respond more slowly.

In an embodiment, a proxy priority queue is maintained independent from the query priority queue described above. Alternatively, a proxy priority queue is integrated with the query priority queue.

When a query needs to be made of an information source, a proxy record is pulled off the top of the proxy priority queue and the query is sent to the corresponding proxy. When a response comes back from the proxy (or the request times out), the proxy's record is pushed back onto the proxy queue. When the proxy queue is empty and a query needs to be posed, the process sleeps until a proxy record is pushed onto the proxy queue. For example, where consumer threads are utilized to process queries, as described above, the consumer thread sleeps until a proxy is available.

This method tends to ensure that the available proxies will be driven at maximum capacity.

3. Unsupported Suppliers

Information sources may obtain information from multiple and/or different information suppliers. For example, in the airline industry, an airline may provide information to a first information source but not to a second information source. For example, an airline might provide availability information through Worldspan but not through Amadeus. Thus, the airline's information can be obtained by an availability server through a first proxy designed for the first information source, but not through a second proxy designed for the second information source. Given any set of proxies, then, there may be one or more information suppliers for whom availability information cannot be obtained (i.e., "unsupported suppliers"). Rather than waste queries on these suppliers, the availability server itself can inform clients that availability information is not obtainable for the unsupported suppliers.

Thus in an embodiment, an availability server maintains a list of unsupported suppliers. The list can be derived and/or updated as often as desired (daily, for example), by posing availability queries to all the available proxies. Generally, a proxy will return some indicative error in response to queries for unsupported suppliers. This information can be collected into a list of unsupported suppliers. The availability server can load the updated list as needed.

4. Faking Replies for Debugging Purposes

In an embodiment, an availability server generates replies that look like they came from proxies. These pseudo replies can be used for stress testing and/or debugging. This can be implemented by writing code that matches each proxy's output format. Once in place, this code can simulate real time replies at an accelerated rate.

VI. Distributed Architecture

In an embodiment, a server in accordance with the invention runs on a single processor. In such an embodiment, the server can be implemented as a single process or as multiple processes handled by a multitasking operating system.

Alternatively, a server in accordance with the invention runs a distributed architecture where the server's work is spread among a number of processors or machines. This provides scalability and fault tolerance.

In an example distributed architecture implementation, a server is defined in terms of layers. Example processes are now described for the three layers. One or more instances of one of more of the example processes can be initiated on one or more of the layers.

A query distribution layer is responsible for receiving queries and for distributing them to the appropriate processes in a cache layer described below. The query distribution layer performs a load balancing function across the distributed architecture. The query distribution layer can be implemented across multiple processors. Additionally or alternatively, multiple instances of the query distribution process can be implemented for fault tolerance.

A cache layer is responsible for maintaining a cache. Typically, the cache will be divided up among a number of server processes. For example, in an airline availability implementation, one process might cache United Airlines availability information while another process caches American Airlines availability information. A cache layer process receives queries from the query distribution layer processes. The cache layer process either answers the query (if the query is for cached data) or forwards the query to a gateway process in the gateway layer.

Where caching is not employed, the cache layer is optionally replaced with a query processing layer, which may include without limitation, a query priority queue.

A gateway layer manages connections with information sources and/or proxies, and answers queries for real time information.

The three layers described above can be implemented in a variety of ways. In an embodiment, a server is implemented on a plurality of processors operating under a single operating system, referred to interchangeably herein as a kernel or machine. In an alternative embodiment, a server is implemented across multiple kernels, each kernel including one or more processors operating under an operating system. An operating system in one kernel may or may not be the same as an operating system in another kernel.

The present invention is preferably implemented as an application program that runs within a kernel. Optionally, multiple instances of the application, or processes within the application, run within a kernel, and/or on other kernels (e.g., query distribution, caching, or gatewaying). There are many ways to design such a run control or "RC" file. An example is provided below:

```
# Query Distribution
distrib d1:10300
distrib d2:10300
distrib d3:10300
# caching
cache UA    c1:10200
cache AA    c2:10200
cache DL    c3:10200
cache NW    c4:10200
```

-continued

```
cache CO    c5:10200
cache US    c6:10200
cache **    c7:10200      # cache all others here
# Gatewaying
gw *W   gw1:10100         # Worldspan-only carriers
gw *A   gw2:10100         # Amadeus-only carriers
gw **   gw3:10100         # Carriers supported by all CRS's
```

The example RC file above indicates that machines d1, d2, and d3 all run query distributor processes. More specifically, it informs the availability server processes started on port 10300 of machines d1, d2, and d3, that they should behave as query distributors by running the appropriate code.

Furthermore, the RC file indicates that caching will be divided among seven machines, according to airlines, and that gatewaying will be divided among three machines called gw1, gw2, and gw3.

A. Internal Representation of an RC File

Preferably, information contained in a shared RC file is stored efficiently so that a given process can quickly identify its, and other processes, responsibilities. For example, a shared RC file can be implemented as a hash table, where entries are hashed by task (e.g., distributor, cache, gateway) and airline/CRS (from the example above, UA, AA, *W, etc.).

A hash table implementation provides a function that can quickly determine, for a given airline, which process is responsible for caching (or gatewaying) for that airline.

This is useful for query forwarding, described below.

B. Query Forwarding

In an embodiment, when a query distribution layer process receives an availability query, it determines whether to divide the work of answering the query among multiple cache layer processes or query processing layer processes. Using the example RC file above, if a query includes flight availability queries for both American and United flights, then the query distributor forwards the American sub-queries to one process and the United sub-queries to another process.

When a shared RC file is implemented as a hash table, as described above, the query forwarding process depends on the hash table representation of the RC file, and generally requires code to compose a flight availability query from a list of flights ("query forwarding availability query"). In other words, an availability server process now acts like a client.

Typically, an availability query has an associated timeout—the amount of time the client is willing to wait for the answer. When forwarding a query (or part of a query), as described above, the timeout should be adjusted to compensate for any internal and/or forwarding delay. Usually, a fixed timeout reduction will work. For example, the timeout can be reduced by 100 milliseconds each time a query is forwarded. More sophisticated techniques, such as using network time protocols to track real time from query to query can be employed as an optimization.

C. Intelligent Query Routing

Queries can be routed to favor one or more information source(s) over others. For example, if one CRS has better data for US Airways, an RC file can specify that US Airways queries be routed to the gateway responsible for that CRS. This per-airline data source knowledge encoded in the RC file can be updated, daily for example, if data source quality levels fluctuate.

More sophisticated query routing schemes can be implemented as well. For example, preference of one information source over another can be linked to market (e.g., NYC-LAX), flight departure time, current time of day, relative load on one information source versus another, and so on.

D. Broadcast Packets

Broadcast packets (such as UDP packets) can be used to share information among different processes within and/or between layers. Broadcast packets can be used for heartbeat monitoring, for example, where one or more server processes broadcast a packet indicating that the process is still working, and perhaps other aspects of its current state. A process can re-broadcast at intervals, such as one second, for example.

One or more processes can monitor broadcast packets to identify which machines and/or processes are functioning. Processes can monitor broadcast packets to track the liveness of other processes that they forward to and use the information to determine whether to substitute another process. For example, a first process can forward to a mirror process when a target machine has not recently broadcast a heartbeat (and is therefore assumed to be dead).

Broadcast packets can also contain information to be shared among processes within a layer. For example, when a caching process receives new flight availability information, it can broadcast this information in a packet that other caching processes can listen for. This can be used to implement a mirror cache, for example, where each cache instance incorporates information that other cache instances have retrieved.

E. Distribution of Data to Remote Processes

In some cases, it may be necessary and/or desirable to implement availability server processes geographically apart. When this occurs, network delays between distant processes become significant. In such situations, using broadcast packets to share information among the processes may be impractical. This is because typical routers do not route UDP packets beyond local area networks.

In an embodiment, one or more processes can request information from one or more other processes. For example, a first process may request a second process to send availability information for all flights updated in the past minute. In this way, information received by other parts of the system can be shared among multiple processes, such as geographically distant processes.

This strategy allows one to set up a primary availability server (divided into layers on a LAN, for example), and various secondary availability servers (likewise divided into layers on their local LANs, for example), and distribute data periodically from the primary to the secondaries to keep the secondaries in sync. This data sharing can be made bi-directional as well, if necessary.

VII. Example Implementations

Additional example implementations of the invention are described below to assist the reader in understanding the invention. The invention is not, however, limited to the example implementations described herein. Features described and illustrated herein can be practiced individually and/or in various combinations with one another, and/or with other features described herein. Based on the description herein, one skilled in the relevant art(s) will understand other feature combinations, which are within the scope of the present invention.

A. Example Methods

Figure 12A:
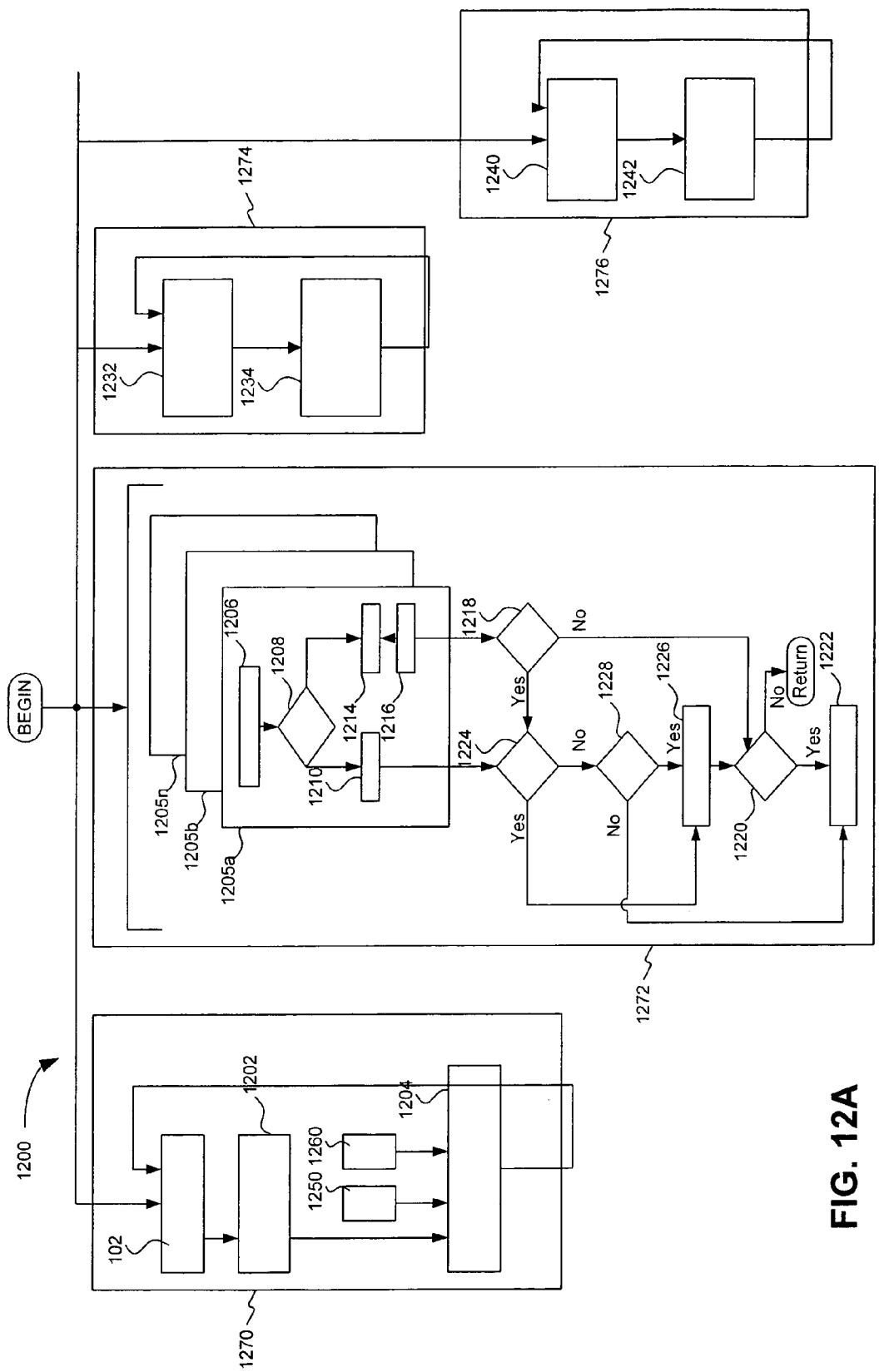
FIG. 12A illustrates an example process flow chart, in accordance with the invention.

FIG. 12A illustrates an example process flow chart implementing features of the invention. The processes illustrated in FIG. 12A include a query receiving process 1270, a query processing process 1272, a proxy monitoring process 1274, and a snooping process 1276. The query receiving process 1270, the proxy monitoring process 1274, and the snooping process 1276, are illustrated in greater detail in FIG. 12B. The query processing process 1272 is illustrated in greater detail in FIG. 12C.

The processes illustrated in FIG. 12A can be performed alone and/or in one or more of a variety of combinations with one another and/or with other processes. Two or more of the processes illustrated in FIG. 12A can be performed in parallel. One or more of the processes illustrated in FIG. 12A can be performed in a multi-tasking environment, on a single processor, over multiple processors, on a single machine, on multiple machines, in a distributed architecture environment, and/or in any other suitable fashion.

The example processes illustrated in FIG. 12A are now described with reference to FIGS. 12B and 12C.

Figure 12B:
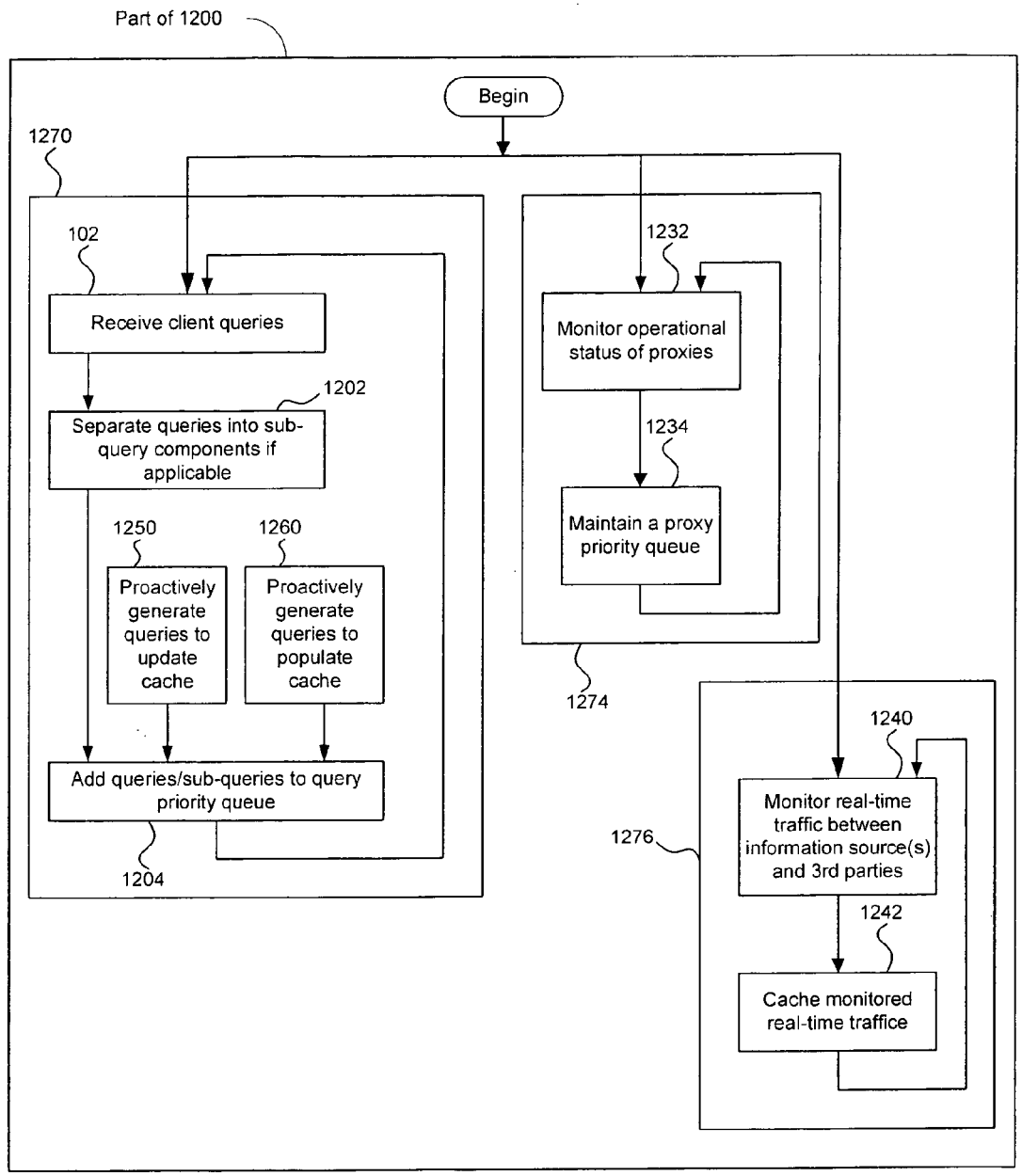
FIG. 12B illustrates example implementation details for the process flow chart illustrated in FIG. 12A.

FIG. 12B illustrates query receiving process 1270, which begins with step 102 from FIG. 1, receiving client queries.

In step 1202, the received client queries are separated into sub-queries, if applicable. For example, in the airline availability server environment described above, a client query can include multiple flights and/or market queries. Each flight and/or market query is separated as a sub-query in step 1202.

In step 1204, the client sub-queries, and any other queries, are added to a query priority queue. Other queries can include, for example, queries generated proactively in support of an optional cache. For example, optional step 1250 includes proactively generating queries to update a cache. Similarly, optional step 1260 includes proactively generating queries to populate a cache.

After step 1204, processing returns to step 102 to receive additional client queries.

Figure 12C:
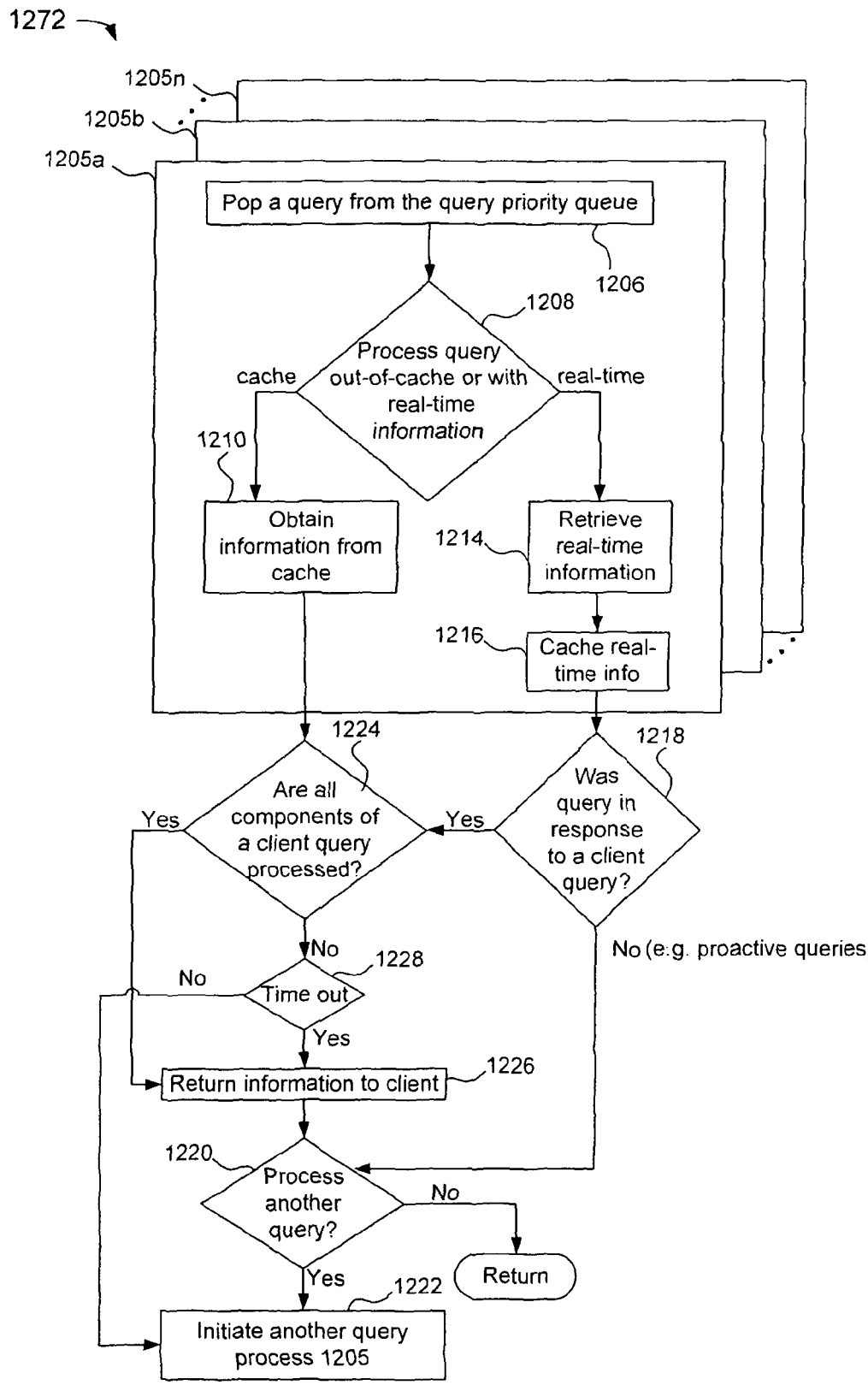
FIG. 12C illustrates example implementation details for the process flow chart illustrated in FIG. 12A.

In FIG. 12C, query processing process 1272 begins at step 1206, removing a query from the query priority queue. Query priority queues are described above. In an embodiment, multiple queries are processed at a time. For example, in an embodiment, a new thread is generated for each query removed from the query priority queue, illustrated here as threads 1205a through 1205n. In an embodiment, multiple threads 1205 are processed in a multi-tasking environment. Alternatively, threads 1205 are processed one at a time.

In step 1208, a determination is made to process the query out-of-cache or with real-time information.

Where optional proactive queries are generated (e.g., step 1250 and/or 1260), step 1208 will typically include determining if a query is a proactive query. If so, processing will proceed to step 1214, retrieving real-time information.

In other situations, one or more factors may be considered in deciding whether to retrieve cached information or real-time information.

For example, in an embodiment, clients are permitted to indicate a preference for cache and/or realtime information. In step 1208, such client preferences can be controlling, or can be considered along with one or more other factors in determining whether to provide information out-of-cache or real-time.

Figure 13A:
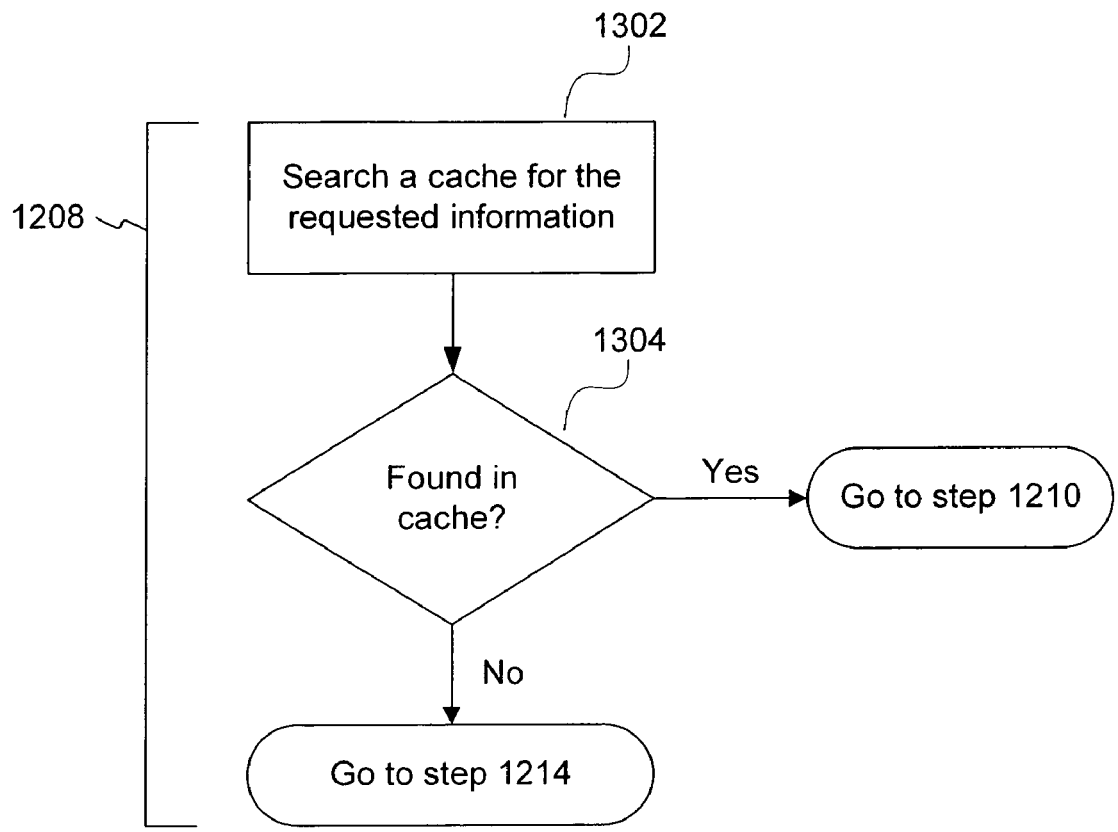
FIG. 13A illustrates example implementation -details for the process flow chart illustrated in FIG. 12A.

FIG. 13A illustrates another example method for performing step 1208. The process begins at step 1302, searching a cache for requested information. In step 1304, if the requested information was found in cache, processing proceeds to step 1210 (FIG. 12), where the requested information is retrieved from the cache. However, if the requested information is not found in cache, processing proceeds to step 1214 (FIG. 12), where the requested information is retrieved from an information source.

Figure 13B:
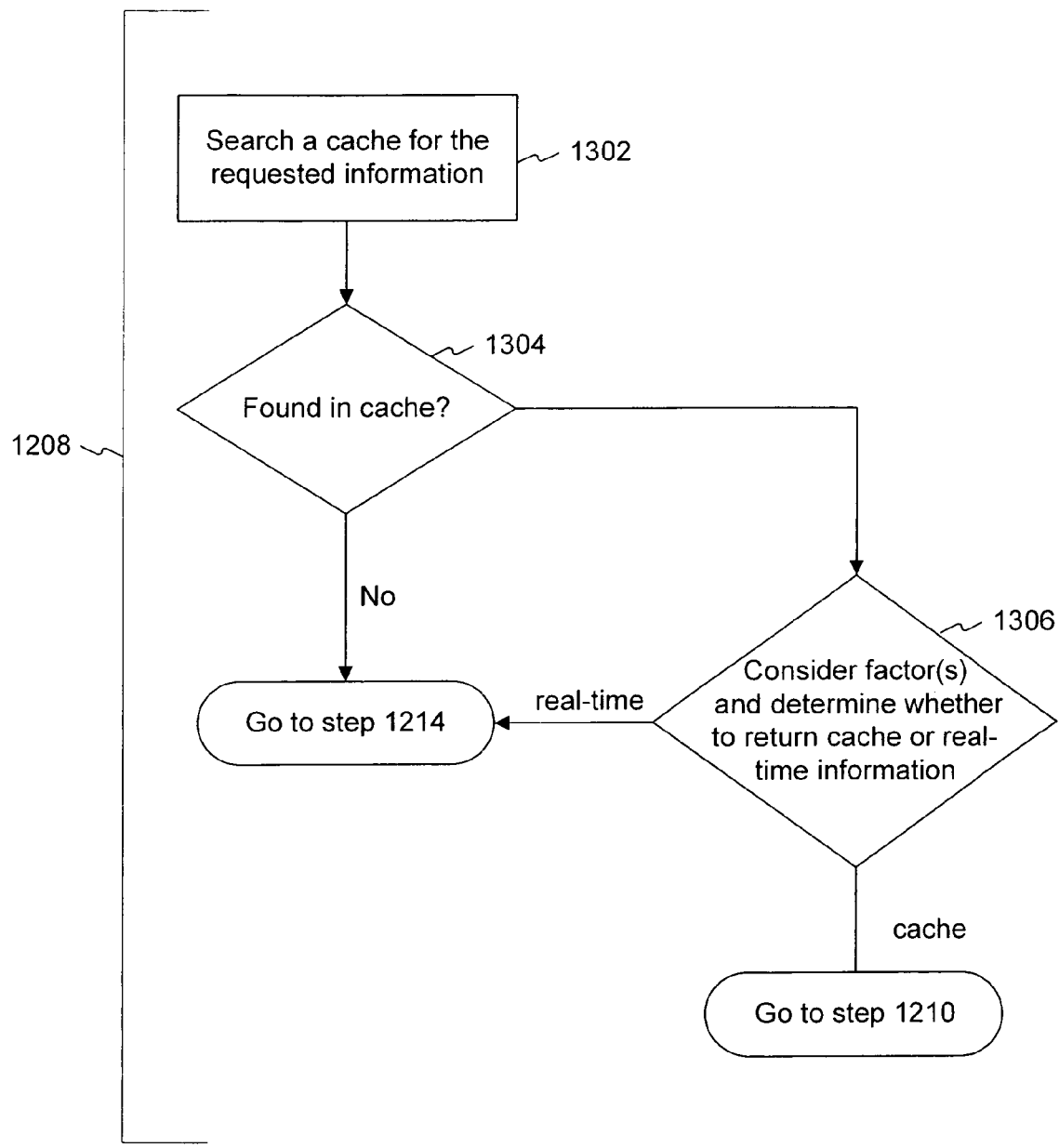
FIG. 13B illustrates example implementation details for the process flow chart illustrated in FIG. 12A.

FIG. 13B illustrates an another example method for performing step 1208. The process is similar to that illustrated in FIG. 13A, with the addition of step 1306, where, if the requested information is found in cache, one or more additional factors are considered in determining whether to return the cached information to the client or real-time information. Such other factors can include, without limitation:
- client preference for cached and/or realtime data;
- the availability of requested information in cache;
- an age of the cached information;
- a client identification and/or client importance factor;
- time of day;
- proxy availability;
- potentially using recently cached information in place of realtime information;
- one or more rules associated with an information source.
- an activity/load at a realtime information source; and, in the case of an airline availability server:
- time to departure;
- market importance;
- frequency of prior availability changes;
- currently cached availability count; and
- type of transportation.

Referring back to step 1208 in FIG. 12C, when real-time information is selected, processing proceeds to step 1214, where real-time information is retrieved from one or more information sources.

Figure 13C:
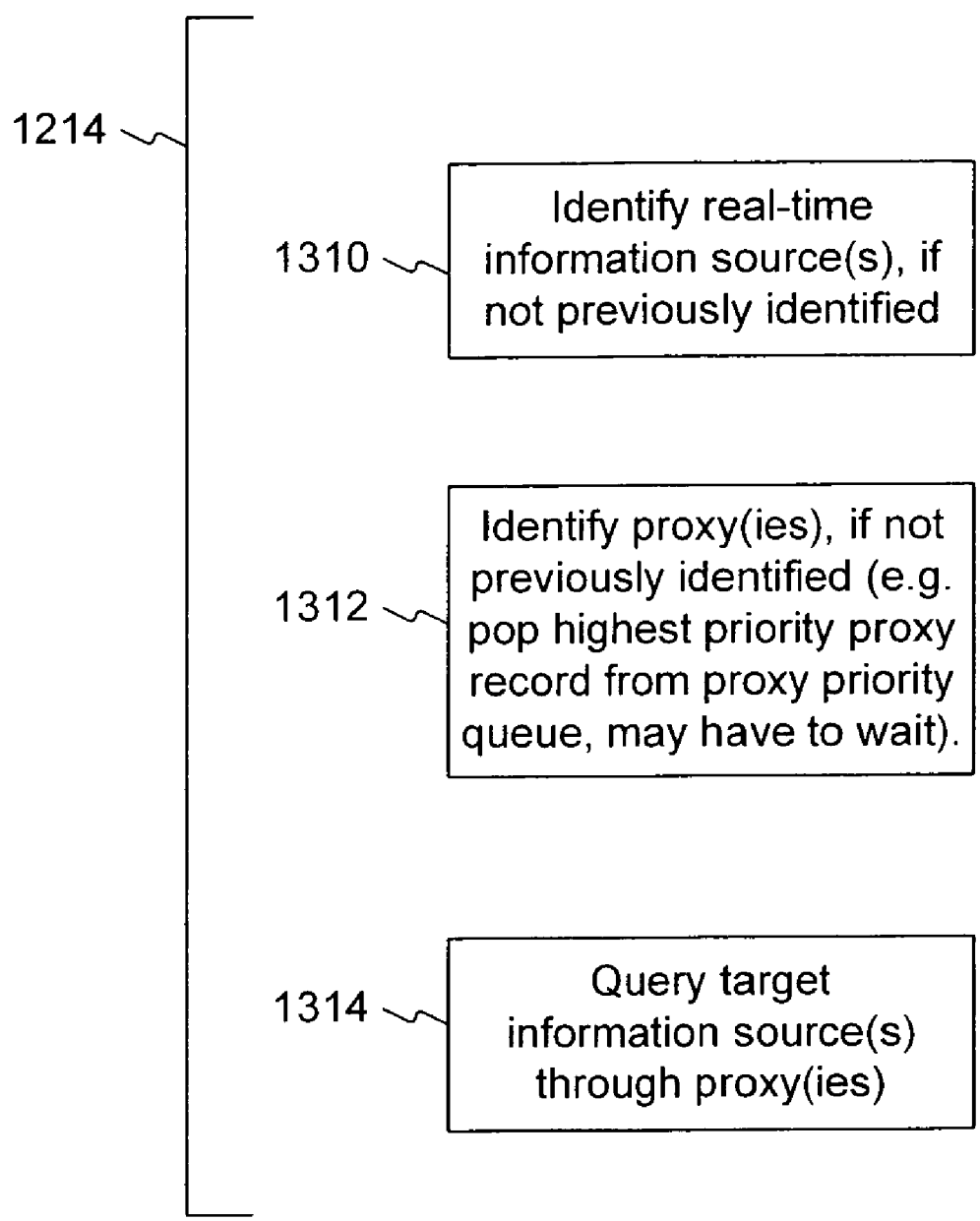
FIG. 13C illustrates example implementation details for the process flow chart illustrated in FIG. 12A.

FIG. 13C illustrates an example implementation of 1214. Processing begins at step 1310, which includes identifying one or more real-time information sources, if not previously identified. A real-time information source may already have been identified in step 1208, for example, in determining whether to retrieve information from cache or from a real-time information source.

One or more realtime information sources can be selected based on one or more of a variety of factors and/or rules. Information contained in the query may be applied to one or more rules for accessing information source.

For example, in an airline availability server implementation, one or more airlines may be associated, by rules or other mechanism, with one or more information sources. Other factors may also be considered, such as a time of day. For example, certain information sources may have better or worse availability at different times of day. Other factors that could be considered include, without limitation, agreement terms with the information source. In addition, or alternatively, information source selection can be based, in whole or in part, on one or more operational parameters of information sources. Operational parameters can be monitored or received from the information source directly.

After the information source(s) is identified, processing proceeds to step 1308, which includes identifying one or more proxies, if not previously identified. Step 1308 can be performed with or without step 1306, and vice versa. Step 1308 may already have been performed as part of step 1208. In an embodiment, where a proxy priority queue is maintained, step 1308 is performed by popping the highest priority proxy record from the proxy priority queue. If no proxy record is presently available in the proxy priority queue, the processing may wait at step 1308 for an available proxy.

Step 1310 includes querying the one or more target information sources through the one or more proxies identified in steps 1306 and 1308, respectively.

Referring back to FIG. 12C, after step 1214, processing proceeds to step 1216, caching the retrieved real-time information. Where caching is not implemented, step 1216 is omitted.

In step 1216, the received realtime information is cached.

In step 1218, a determination is made as to whether the query that was processed in step 1212 was in response to a client query. Step 1218, is optional, and is generally performed where and is intended to be performed where proactive queries are performed. For example, where proactive queries are generated to populate a cache and/or to update a cache. Such queries are not, necessarily, in response to a client query. Where with a query was not in response to a client query processing proceeds to step 1220, which asks, whether another query is to be processed. If not, processing stops. If so, processing proceeds to step 1222, initiate another process 1205.

Referring back to process 1205 in FIG. 12C, where caching is not implemented, steps 1208 and 1210 can be omitted, and processing proceeds from step 1206 to step 1214, retrieving real-time information. Referring back to step 1208, when a determination is made in step 1208 to process the query out of cache, processing proceeds to step 1210, obtaining information from cache.

Processing proceeds to step 1224, where a determination is made as to whether all sub-queries or components of a client query have been processed. If so, processing proceeds to step 1226, returning information to the client. If not, processing proceeds to optional step 1228 which determines whether a time out has expired for the client query associated with the associated client sub-query. If the timeout has not expired, processing proceeds to step 1222, and another process 1205 is initiated. However, if the timeout in step 1228 has expired, processing proceeds to step 1226 and whatever information has been obtained for the client is returned to the client. Preferably, any remaining sub-queries associated with the client query (i.e., sub-queries that will not be processed because of the time-out), will be removed from the query priority queue.

In an embodiment, step 1214 is performed using one or more proxies. In an embodiment, multiple instances of one or more proxy applications are initiated to communicate with one or more information sources.

In addition, or alternatively, a proxy queue is maintained for available proxies.

In an embodiment, operational status of the proxies is monitored to optimize use of the proxies. FIG. 12B illustrates an example process 1270 for monitoring proxies and utilizing a proxy queue. The process begins at step 1232, monitoring operational status of proxies. Step 1234 includes maintaining a proxy priority queue. For example, a proxy record can be generated for each available proxy and can be placed in the proxy priority queue. The records can be prioritized in the queue based on one or more of a variety of operational variables monitored in step 1232.

When proxy priority queue is maintained, a proxy record is removed from the queue for each instance of step 1216 (FIG. 12C).

Referring to the process 1276 in FIG. 12B, another way of populating cache is to monitor real-time traffic between one or more information sources and one or more third party clients of the one or more information sources. For example, step 1240 includes monitoring real-time traffic between information sources and third parties and step 1242 includes caching monitored realtime traffic.

FIG. 12 is an example implementation of the present invention that illustrates a variety of features of the present invention. However, the features illustrated in FIG. 12 do not necessarily all have to be practiced together. Similarly, other features of the invention described throughout the specification can be implemented as well.

B. Example Systems

Example implementations of server 200 (FIG. 2) are described and illustrated below.

Figure 14:
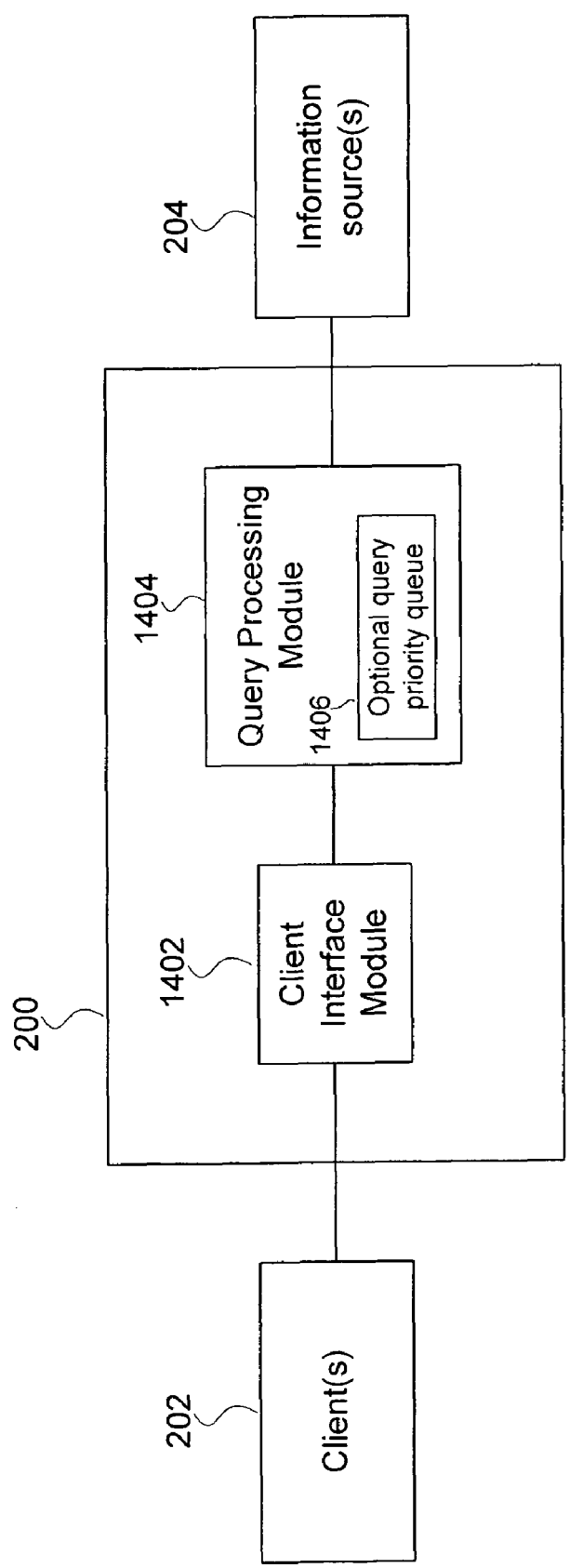
FIG. 14 illustrates an example server, in accordance with the invention.

FIG. 14 illustrates an example server 200 including a client interface module 1402 and a query processor module 1404. In an embodiment, the query processor module 1404 includes an optional query priority queue 1406 as described above.

The client interface module 1402 performs one or more of a variety of client interfacing features. For example, client interface module 1402 can implement steps 102, 1202, and 1204, in FIG. 12A and step 1226 in FIG. 12C.

Referring back to FIG. 14, query processor module 1404 can perform one or more of a variety query processing features, including, without limitation, one or more query processing features illustrated in FIG. 12C.

Figure 15:
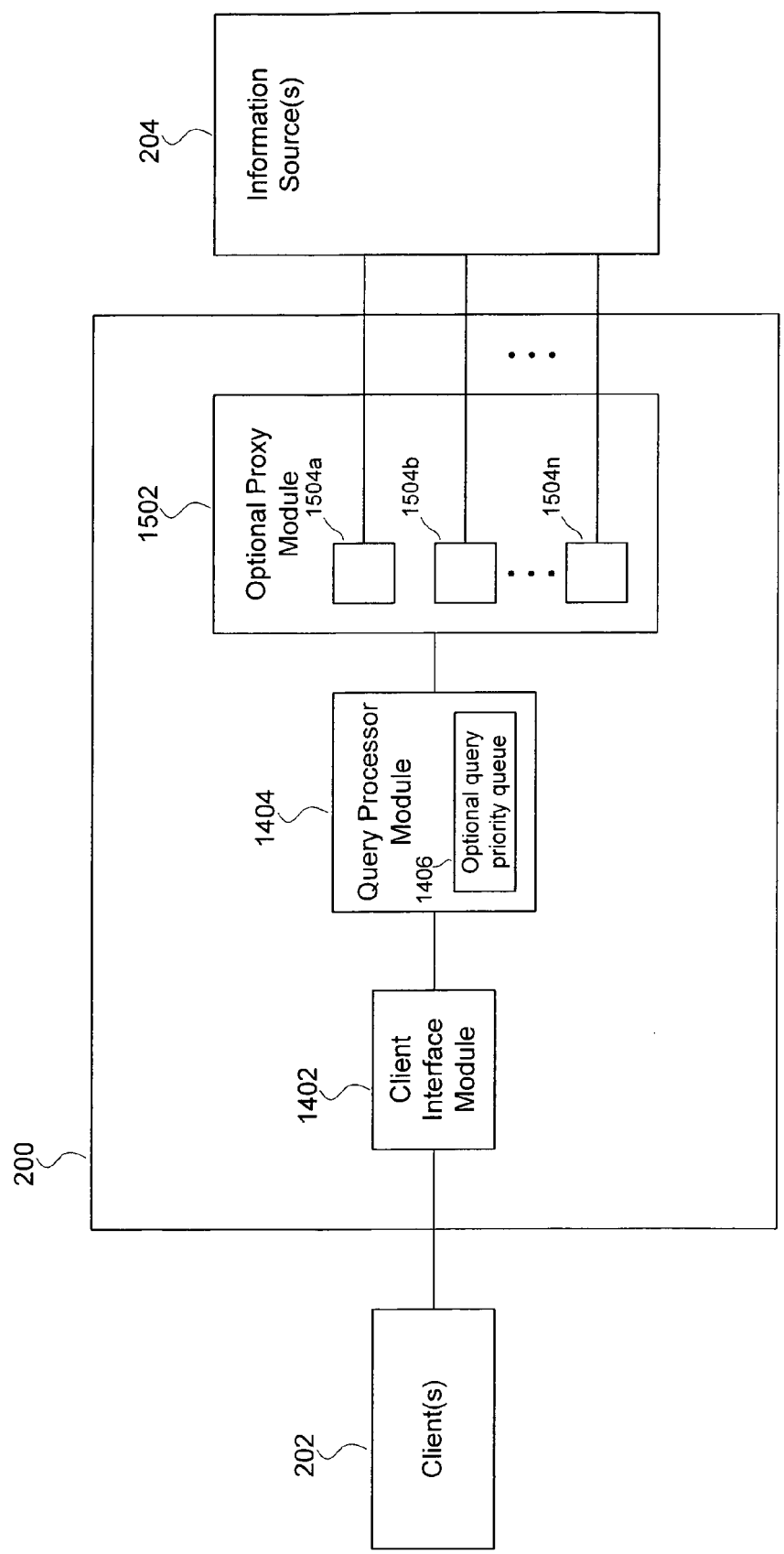
FIG. 15 illustrates an example server, in accordance with the invention.

FIG. 15 illustrates an embodiment of server 200, similar that illustrated in FIG. 14, with the addition of an optional proxy module 1502. Optional proxy module 1502 includes one or more instances of one or more proxies, such as proxies 1504a-1504n.

Proxies 1504 interface between query processor module 1404 and information sources 204, as described above.

Figure 16:
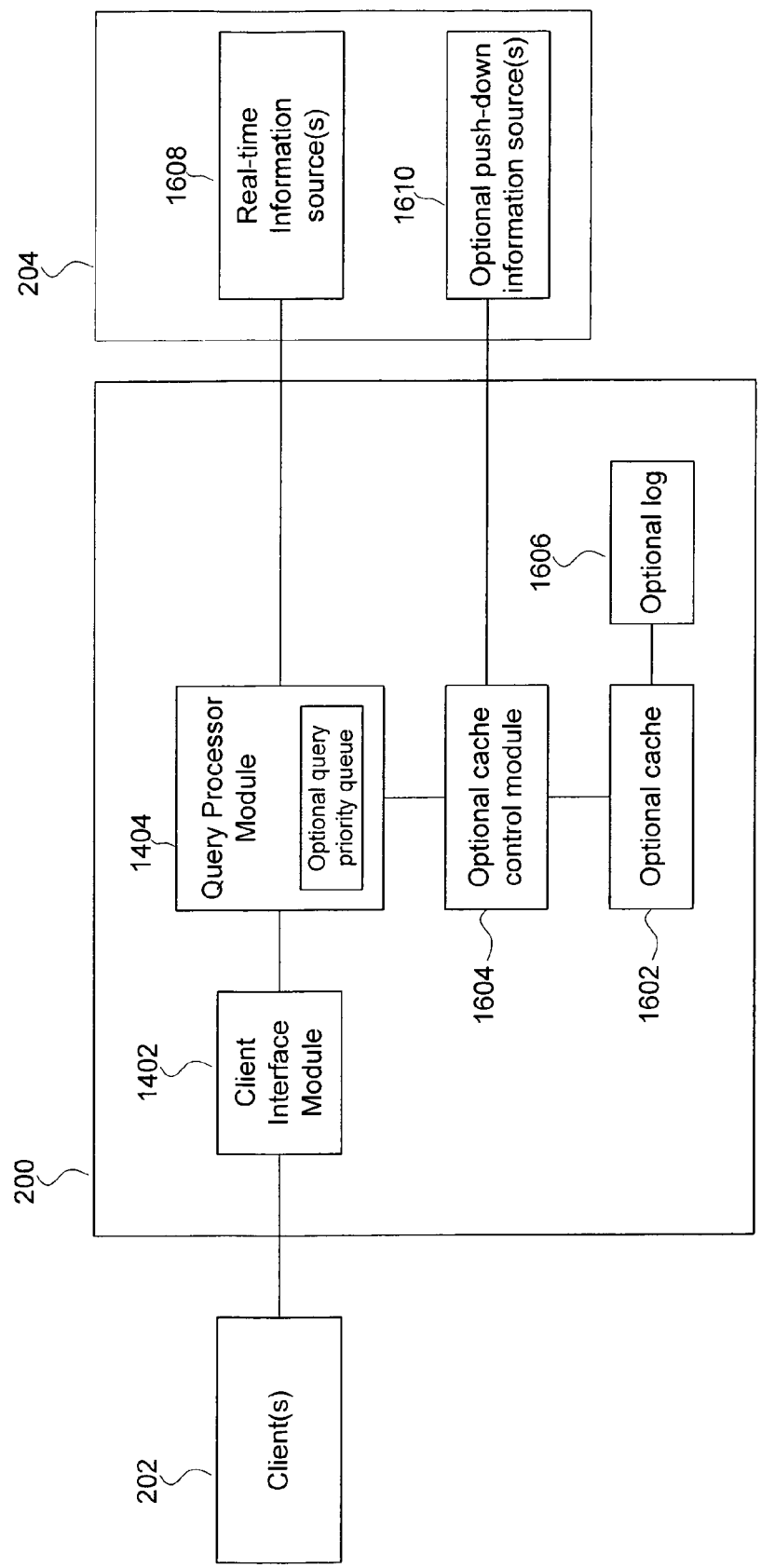
FIG. 16 illustrates an example server, in accordance with the invention.

FIG. 16 illustrates server 200 with an optional cache 1602, an optional cache control module 1604, and an optional log 1606. Optional cache 1602 stores information obtained from information sources 204, illustrated here as one or more real-time information sources 1608 and one or more optional push-down information sources 1610, as described above.

Optional cache control module 1604 controls reading and writing to optional cache 1602.

Optional log 1606 can be used to store a current state of optional cache 1602. In addition, or alternatively, optional log 1606 is used to maintain a running log of optional cache 1602, as described above.

When caching is implemented, as illustrated in FIG. 16, for example, query processor module 1404 preferably includes logic and/or other determinative of means to implement step 1208 in FIG. 12C, namely, determining whether to respond to a query out-of-cache or with real-time information.

Figure 17:
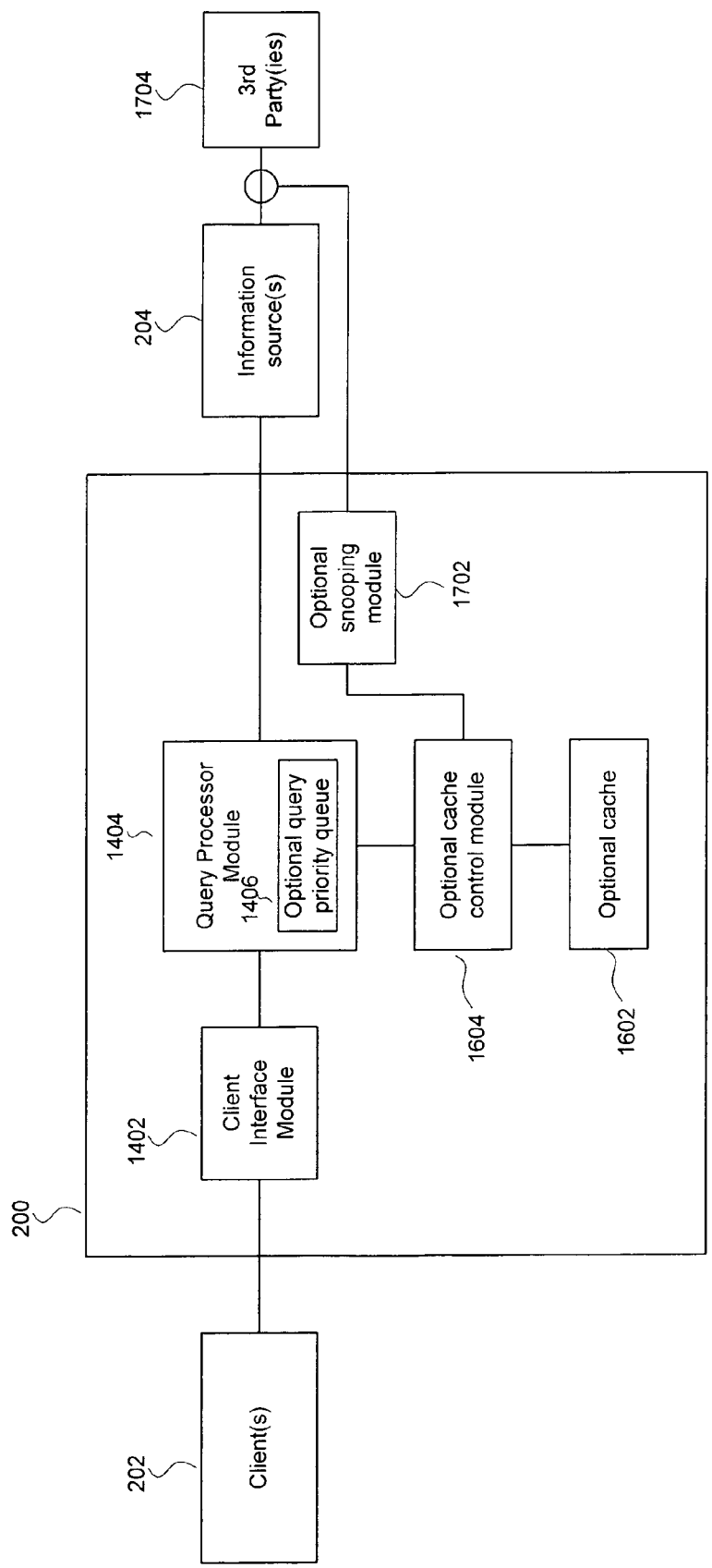
FIG. 17 illustrates an example server, in accordance with the invention.
Figure 18:
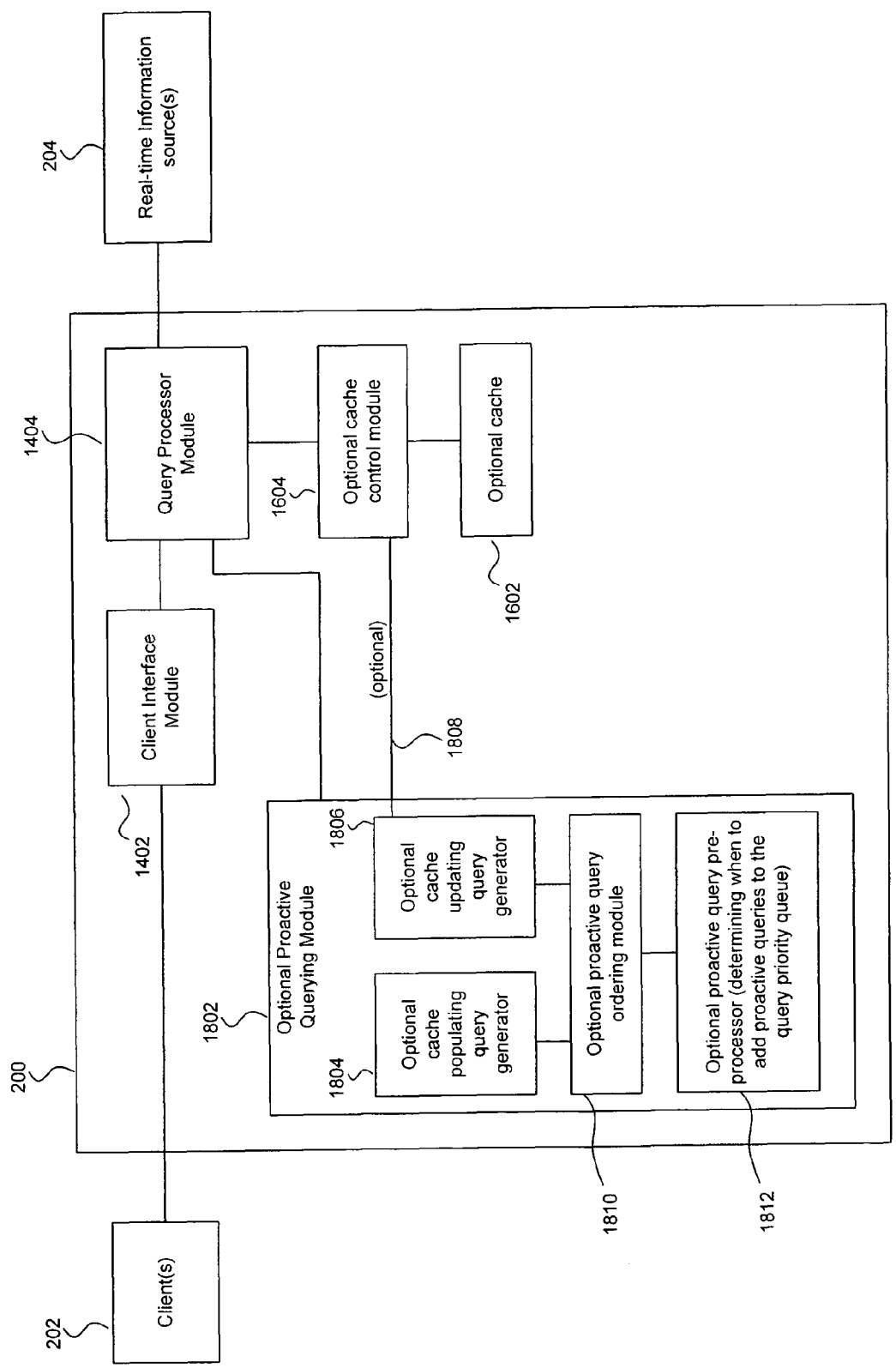
FIG. 18 illustrates an example server, in accordance with the invention.

One or more other caching features described above can be implemented in the server 200 illustrated in FIG. 16 as well. For example, FIG. 17 illustrates an optional snooping module 1702 that monitors traffic between one or more information sources 204 and one or more third parties 1704. In an embodiment, optional snooping module 1702 is implemented partially within server 200 and partially within or near the one or more information sources 204. For example, hardware and/or software can be implemented within an information source 204, under an agreement with an organization that maintains the information source 204. Optional snooping module 1702 provides monitored information back to optional cache control module 1604 for storage in optional cache 1602. In an embodiment, optional snooping module 1702 and/or optional cache control module 1604 parses information from monitored information.

Where optional caching is implemented, one or more optional proactive querying features can be implemented. For example, FIG. 18 illustrates an optional proactive querying module 1802, including an optional cache populating query generator 1804 and an optional cache updating query generator 1806. Optional proactive querying module can include one or both of modules 1804 and 1806.

Optional cache populating query generator 1804 generates queries to one or more information sources 204 in order to populate optional cache 1602. For example, optional cache populating query generator 1804 can begin with a list of all known airline flights for the next year and generate availability queries for the future flights.

Optional cache updating query generator 1806 generates queries to update presently cached information. An optional connection 1808 provides the optional cache update inquiry generator 1806 with presently cached information.

In an embodiment, optional proactive querying module 1802 includes an optional proactive query ordering module 1810, which orders proactive queries for processing. Proactive queries can be ordered according to one or more of a variety of factors as described above. After the proactive queries are ordered, they can be placed on a query priority queue as illustrated by step 1204 in FIG. 12B, for example.

In an embodiment, optional proactive querying module 1802 includes an optional proactive query pre-processor 1812. Optional proactive query pre-processor 1812 can be used to control how the ordered queries are added to the query priority queue. For example, optional proactive query preprocessor 1812 can receive feedback from the query priority queue so that an optimal number of proactive queries are maintained within the query priority queue. For example, when a number of proactive queries in the query priority queue drop below a predetermined number, additional proactive queries can be added to the query priority queue.

Alternatively, optional proactive query preprocessor 1812 can add proactive queries to the query priority queue based on one or more alternative or additional factors. For example, proactive queries can be added to a query priority queue based on time of day, proxy to be used, information source to be queried, number of prior queries to a particular information source within a certain passage of time, etc.

Figure 19:
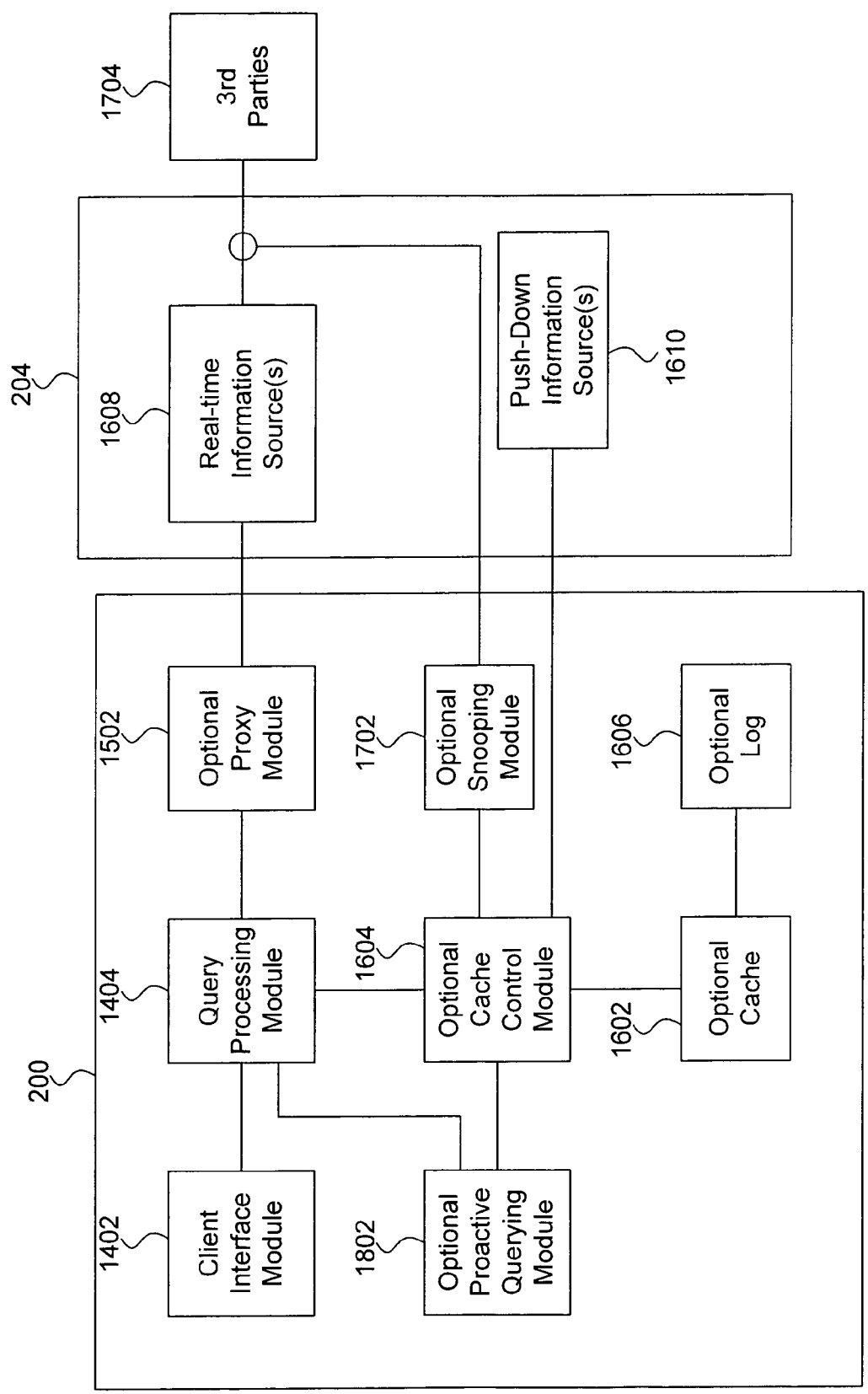
FIG. 19 illustrates an example server, in accordance with the invention.

FIG. 19 illustrates another example implementation of server 200 which includes various features described above.

Based on the description herein, one skilled in the relevant art(s) will understand that other combinations of features can also be implemented in accordance with the invention.

C. Example Computer Program Products

In an embodiment, the invention is implemented in one or more computer systems capable of carrying out the functionality described herein.

Figure 20:
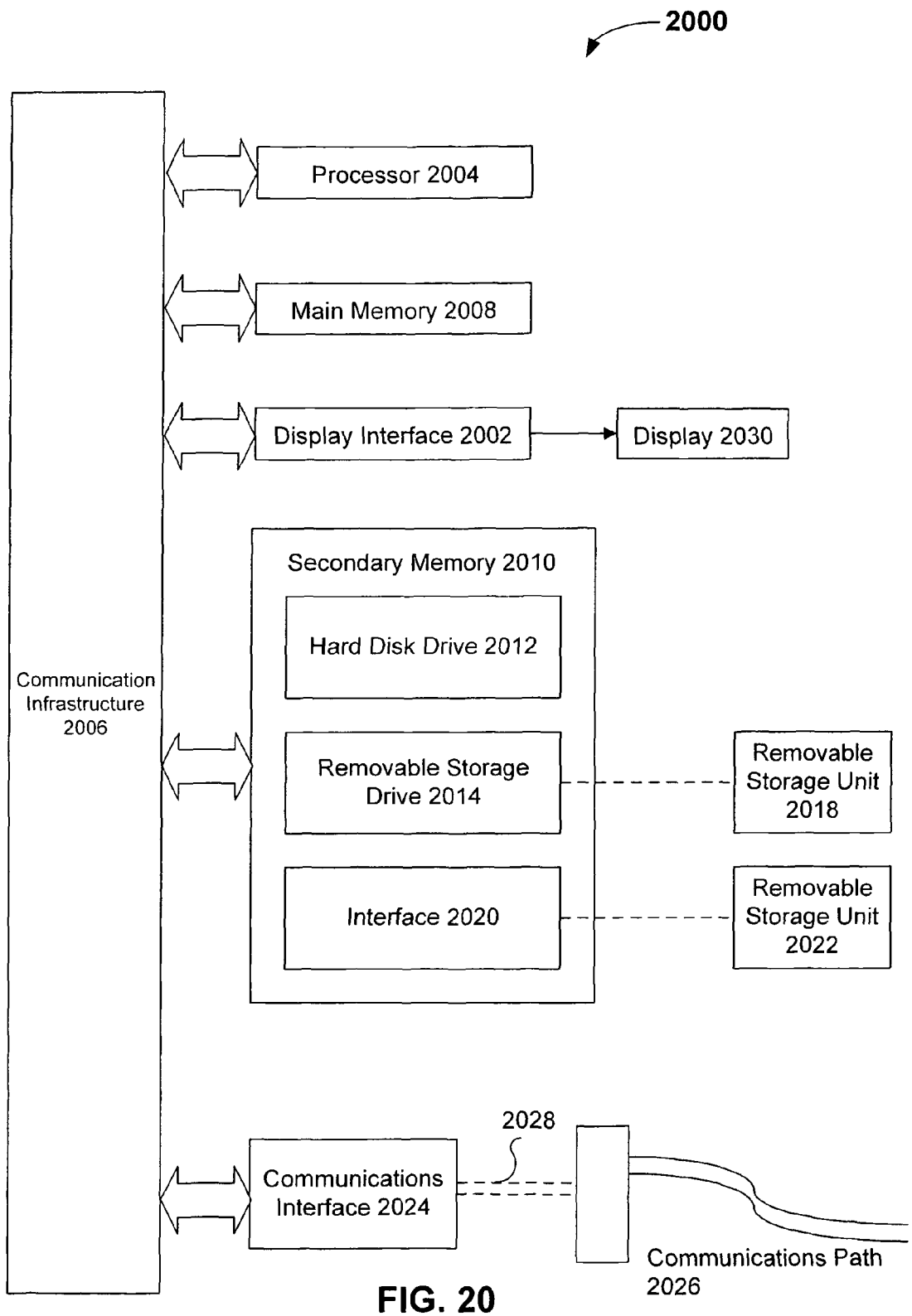
FIG. 20 illustrates a block diagram of an example computer system architecture on which the present invention can be implemented.

FIG. 20 illustrates an example computer system 2000. Various software embodiments are described in terms of this example computer system 2000. After reading this description, it will become apparent to a person skilled in the relevant art how to implement the invention using other computer systems and/or computer architectures.

The example computer system 2000 includes one or more processors 2004. Processor 2004 is connected to a communication bus 2002.

Computer system 2000 also includes a main memory 2006, preferably random access memory (RAM).

Computer system 2000 can also include a secondary memory 2010, which can include, for example, a hard disk drive 2012 and/or a removable storage drive 2014, which can be a floppy disk drive, a magnetic tape drive, an optical disk drive, etc.

Removable storage drive 2014 reads from and/or writes to a removable storage unit 2018 in a well known manner. Removable storage unit 2018, represents a floppy disk, magnetic tape, optical disk, etc. which is read by and written to by removable storage drive 2014. Removable storage unit 2018 includes a computer usable storage medium having stored therein computer software and/or data.

In alternative embodiments, secondary memory 2010 can include other devices that allow computer programs or other instructions to be loaded into computer system 2000. Such devices can include, for example, a removable storage unit 2022 and an interface 2020. Examples of such can include a program cartridge and cartridge interface (such as that found in video game devices), a removable memory chip (such as an EPROM, or PROM) and associated socket, and other removable storage units 2022 and interfaces 2020 that allow software and data to be transferred from the removable storage unit 2022 to computer system 2000.

Computer system 2000 can also include a communications interface 2024, which allows software and data to be transferred between computer system 2000 and external devices. Examples of communications interface 2024 include, but are not limited to a modem, a network interface (such as an Ethernet card), a communications port, a PCMCIA slot and card, etc. Software and data transferred via communications interface 2024 are in the form of signals 2028, which can be electronic, electromagnetic, optical or other signals capable of being received by communications interface 2024. These signals 2026 are provided to communications interface 2024 via a signal path 2026. Signal path 2026 carries signals 2028 and can be implemented using wire or cable, fiber optics, a phone line, a cellular phone link, an RF link and other communications channels.

In this document, the terms "computer program medium" and "computer usable medium" are used to generally refer to media such as removable storage unit 2018, a hard disk installed in hard disk drive 2012, and signals 2028. These computer program products are means for providing software to computer system 2000.

Computer programs (also called computer control logic) are stored in main memory and/or secondary memory 2010. Computer programs can also be received via communications interface 2024. Such computer programs, when executed, enable the computer system 2000 to perform the features of the present invention as discussed herein. In particular, the computer programs, when executed, enable the processor(s) 2004 to perform the features of the present invention. Accordingly, such computer programs represent controllers of the computer system 2000.

In an embodiment where the invention is implemented using software, the software can be stored in a computer program product and loaded into computer system 2000 using removable storage drive 2014, hard drive 2010 or communications interface 2024. The control logic (software), when executed by the processor(s) 2004, causes the processor(s) 2004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VIII. Conclusions

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-implemented method, comprising:
   receiving availability requests from requestors of availability information;
   prioritizing the availability requests, wherein the prioritizing includes prioritizing the availability requests based at least in part on time remaining prior to events associated with the requested availability information;
   processing the availability requests according to the priorities;
   selecting one or more availability information sources to be queried for each of the availability requests based at least in part on policies associated with the requestors;
   querying the selected availability information sources; and
   providing results from the querying to the requestors.

2. The method according to claim 1, wherein the receiving further includes receiving the availability requests over a transmission control protocol ("TCP") based network.

3. The method according to claim 1, wherein the receiving includes receiving compressed availability requests.

4. The method according to claim 1, wherein the selecting includes selecting from amongst at least the following availability information sources:
   one or more real-time query availability information sources; and
   one or more non-real-time query availability information sources.

5. The method according to claim 4, wherein the one or more non-real-time query availability information sources include cached information.

6. The method according to claim 5, wherein the one or more non-real-time query availability information sources further include predicted information.

7. The method according to claim 6, wherein the predicted information includes yield management predicted information.

8. The method according to claim 6, wherein the one or more non-real-time query availability information sources further include calculated information.

9. The method according to claim 8, wherein the calculated information includes simulated yield management calculated information.

10. The method according to claim 8, wherein the selecting further includes selecting from amongst at least the following availability information sources:
    one or more real-time query availability information sources;
    one or more non-real-time query availability information sources; and
    one or more pushed availability information sources.

11. The method according to claim 10, wherein the one or more pushed availability information sources include pushed availability server messages.

12. The method according to claim 10, wherein the selecting further includes selecting from amongst at least the following availability information sources:
    one or more real-time query availability information sources; one or more non-real-time query availability information sources;
    one or more pushed availability information sources; and
    one or more packet sniffing availability information sources.

13. The method according to claim 12, wherein the one or more non-real-time query availability information sources further include information inferred from other queries.

14. The method according to claim 13, wherein the information inferred from other queries includes information inferred from seat map queries.

15. The method according to claim 13, wherein the one or more non-real-time query availability information sources further include synthesized information.

16. The method according to claim 15, wherein the synthesized information includes synthesized information for debugging purposes.

17. The method according to claim 1, wherein the receiving further includes receiving requestor preferences defining a policy.

18. The method according to claim 17, wherein the receiving further includes receiving requestor preferences defining a policy that specifies the use of cached information only if the cached information is within an age limit.

19. The method according to claim 1, wherein the querying includes querying the selected availability information sources via gateways.

20. The method according to claim 1, wherein the providing includes providing reply messages.

21. The method according to claim 20, wherein the providing further includes broadcasting the reply messages.

22. The method according to claim 1, wherein one or more aspects of one or more of the receiving, the prioritizing, the processing, the selecting, the querying, and the providing are executed with a multi-threading computer process.

23. The method according to claim 22, wherein one or more aspects of one or more of the receiving, the prioritizing, the processing, the selecting, the querying, and the providing are executed with a producer-consumer thread model.

24. The method according to claim 23, further comprising:
generating query components from the availability requests;
placing the query components in a queue for processing;
spawning producer threads for the query components in the queue, and using the producer threads to gather data for processing of the query components; and
spawning consumer threads to process the query components in the queue using the data generated by the producer threads.

25. The method according to claim 1, further comprising storing availability information in memory for use with later availability requests.

26. The method according to claim 25, further comprising storing the availability information in memory using a bucketing approach.

27. The method according to claim 26, further comprising apportioning the availability information to buckets according to a first criterion, and ordering the availability information within each bucket according to a second criterion.

28. The method according to claim 27, further comprising generating availability requests to update stored availability information when the availability information stored in one of the buckets exceeds a threshold associated with the second criterion, and periodically re-apportioning the availability information amongst the buckets according the first criterion.

29. The method according to claim 28, further comprising apportioning the availability information to buckets according to a time to an event associated with the availability information, and ordering the availability information within each bucket according to the reliability of the availability information.

30. The method according to claim 25, further comprising compressing the results from the querying in memory.

31. The method according to claim 1, wherein the receiving includes receiving an approximate time to an event for which availability information is sought by the requestor, and wherein the processing includes querying a selected availability information source within a range of time of the approximate time.

32. The method according to claim 31, further comprising storing the availability information in memory using a hash table, wherein an associated hash function receives as input rounded times to events associated with the availability information, and wherein actual times to the events are stored at corresponding hash table entries, wherein the selecting includes searching the hash table for the availability information by rounding the approximate time to an event for which availability information is sought by the requestor, and providing the rounded time to the hash function to identify a hash table entry.

33. The method according to claim 1, further comprising maintaining a run control file that controls one or more aspects of one or more of the receiving, the prioritizing, the processing, the selecting, the querying, and the providing.

34. The method according to claim 33, further comprising maintaining a run control file that includes query distribution settings.

35. A computer program product including a computer readable medium having computer program logic stored therein, the computer program logic comprising:
receive logic to cause a processor to receive availability requests from the requestors of availability information;
priority logic to cause the processor to prioritize the availability requests, wherein the prioritizing includes prioritizing the availability requests based at least in part on time remaining prior to events associated with the requested availability information;
process logic to cause the processor to process the availability requests according to the priorities;
selection logic to cause the processor to select one or more availability information sources to be queried for each of the availability requests based at least in part on policies associated with the requestors;
query logic to cause the processor to query the selected availability information sources; and
results logic to cause the processor to provide results from the querying to the requestors.

* * * * *